United States Patent [19]
Bartholomew

[11] Patent Number: 6,010,160
[45] Date of Patent: Jan. 4, 2000

[54] QUICK CONNECTOR HAVING RING FOR CONFIRMING PROPER CONNECTION

[75] Inventor: Donald D. Bartholomew, Mt. Clemens, Mich.

[73] Assignee: Proprietary Technology, Inc., Bloomfiled Hills, Mich.

[21] Appl. No.: 08/930,537

[22] PCT Filed: Mar. 27, 1995

[86] PCT No.: PCT/US95/03798

§ 371 Date: Jan. 22, 1998

§ 102(e) Date: Jan. 22, 1998

[87] PCT Pub. No.: WO96/30688

PCT Pub. Date: Oct. 3, 1996

Related U.S. Application Data

[63] Continuation-in-part of application No. PCT/US93/11281, Nov. 16, 1993.

[51] Int. Cl.$^7$ .................................................. F16L 39/00
[52] U.S. Cl. .............................. 285/39; 285/84; 285/93; 285/319; 285/921; 29/426.6; 29/453
[58] Field of Search .................................. 285/39, 84, 93, 285/319, 308, 320, 921; 29/426.6, 453

[56] References Cited

U.S. PATENT DOCUMENTS

| | | |
|---|---|---|
| 2,467,370 | 4/1949 | Christensen . |
| 3,603,621 | 9/1971 | Parsons . |
| 4,243,254 | 1/1981 | Hill et al. . |
| 4,423,892 | 1/1984 | Bartholomew . |
| 4,524,995 | 6/1985 | Bartholomew . |
| 4,526,411 | 7/1985 | Bartholomew . |
| 4,541,658 | 9/1985 | Bartholomew . |
| 4,573,716 | 3/1986 | Guest . |
| 4,593,943 | 6/1986 | Hanna et al. . |
| 4,601,497 | 7/1986 | Bartholomew . |
| 4,610,468 | 9/1986 | Wood . |
| 4,637,640 | 1/1987 | Feuraler et al. . |
| 4,643,466 | 2/1987 | Conner et al. . |
| 4,669,757 | 6/1987 | Bartholomew . |
| 4,681,351 | 7/1987 | Bartholomew . |
| 4,721,331 | 1/1988 | Lemelshtrich . |
| 4,778,203 | 10/1988 | Bartholomew . |

(List continued on next page.)

FOREIGN PATENT DOCUMENTS 1391023  1/1965  France .

*Primary Examiner*—Dave W. Arola
*Attorney, Agent, or Firm*—Harness, Dickey & Pierce, PLC

[57] ABSTRACT

In its preferred embodiment, a quick connector (10) for connecting a male conduit (12) to a female receptacle (14) has a pair of waist segments (60 and 62), a body segment (56), and a pair of leg segments (68). Each of the leg segments (68) are defined by a pair of projecting elements (76) which are at least partially compressible toward one another thereby causing the pair of waist segments (60 and 62) to move toward one another. A confirmer ring (114) is provided on the pair of projecting elements (76). Confirmation that the quick connector (10) is properly locked in place is made when the confirmer ring (114) is fully seated within a portion of the opening (18) of female receptacle (14). An alternate embodiment provides for use of the confirmer ring (114) as an installing tool when connecting the male conduit (12) with the female receptacle (14). An additional alternate embodiment allows usage of the confirmer ring (114) as a tool for installation and decoupling of the male conduit (12) into the female receptacle (14), as well as for confirming the connection.

79 Claims, 16 Drawing Sheets

U.S. PATENT DOCUMENTS

| | | |
|---|---|---|
| 4,810,009 | 3/1989 | Legris . |
| 4,811,975 | 3/1989 | Paul, Jr. et al. . |
| 4,828,297 | 5/1989 | Tarum . |
| 4,832,378 | 5/1989 | Zepp . |
| 4,842,309 | 6/1989 | LaVene et al. . |
| 4,844,515 | 7/1989 | Field . |
| 4,867,484 | 9/1989 | Guest . |
| 4,915,136 | 4/1990 | Bartholomew . |
| 4,936,544 | 6/1990 | Bartholomew . |
| 4,943,091 | 7/1990 | Bartholomew . |
| 4,946,205 | 8/1990 | Washizu . |
| 4,948,175 | 8/1990 | Bartholomew . |
| 4,948,176 | 8/1990 | Bartholomew . |
| 4,979,765 | 12/1990 | Bartholomew . |
| 5,002,315 | 3/1991 | Bartholomew . |
| 5,009,454 | 4/1991 | Bartholomew . |
| 5,033,513 | 7/1991 | Bartholomew . |
| 5,067,754 | 11/1991 | Bartholomew . |
| 5,105,787 | 4/1992 | Imoehl . |
| 5,171,028 | 12/1992 | Bartholomew . |
| 5,178,424 | 1/1993 | Klinger ................................. 285/319 |
| 5,209,523 | 5/1993 | Godeau . |
| 5,226,679 | 7/1993 | Klinger . |
| 5,342,099 | 8/1994 | Banner et al. . |
| 5,425,556 | 6/1995 | Stabo . |
| 5,441,313 | 8/1995 | Kalanastivy . |

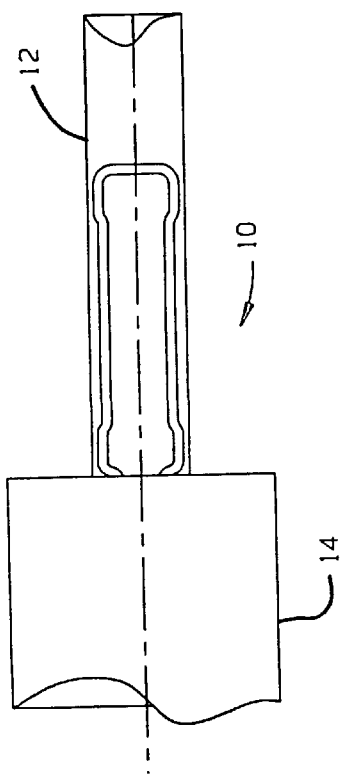
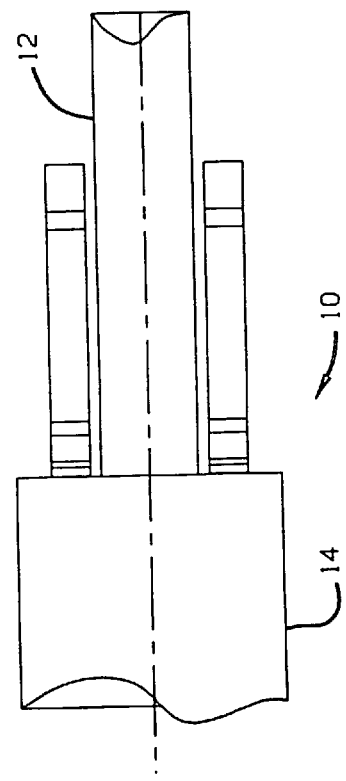
FIG 1
FIG 2

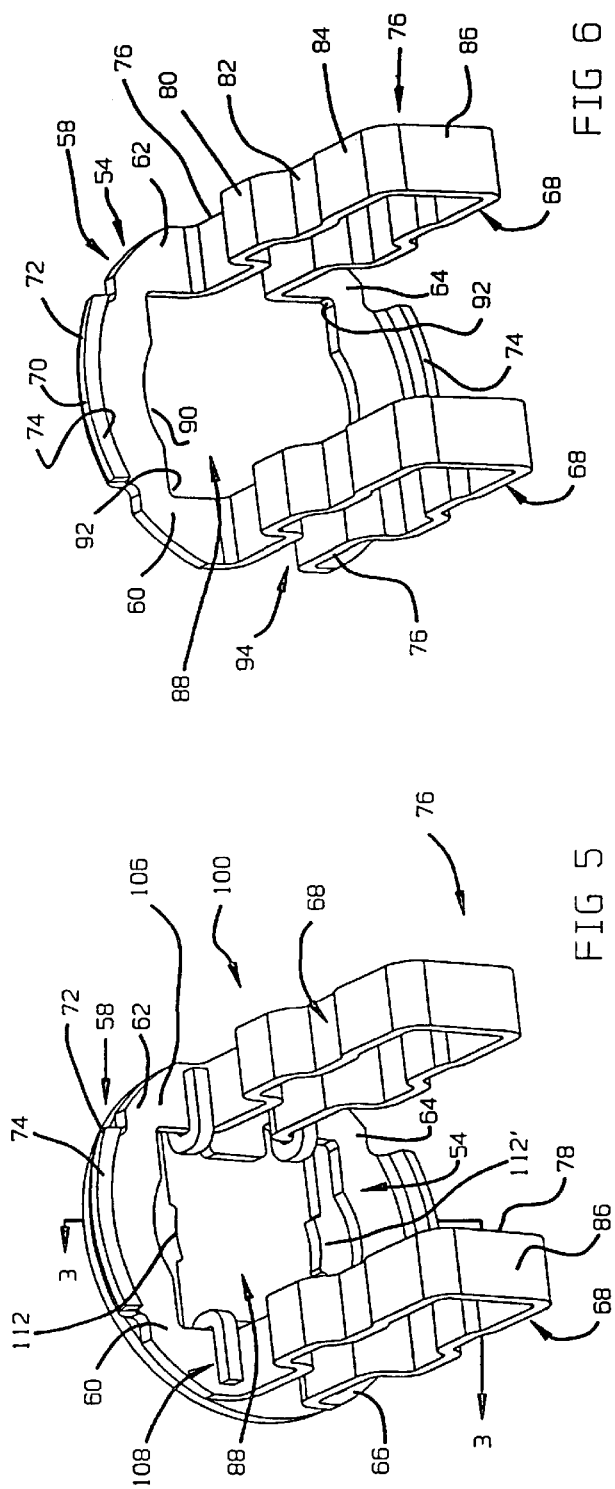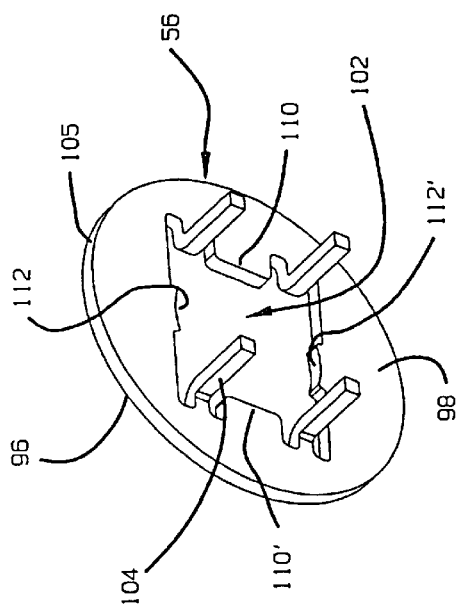

QUICK CONNECTOR HAVING RING FOR CONFIRMING PROPER CONNECTION

CROSS-REFERENCE TO RELATED APPLICATION

This application is a continuation-in-part of PCT/US93/11281, filed Nov. 16, 1993.

BACKGROUND OF THE INVENTION

This invention relates generally to a conduit coupling through which fluid flows. More particularly, the present invention relates to a quick connector which retains a male conduit within a female receptacle and which includes a ring for confirming proper connection.

In the automotive industry (as well as for many other industries) the need always exists for low cost, reliable, and easy-to-assemble components. This need is especially apparent with respect to providing a connection between fluid conveying conduits, such as fuel, brake, or refrigerant lines. Traditionally, such a connection is comprised of a male conduit being retained within a female receptacle through use of threaded fittings, flare fittings, or through bolted-on flanges.

More recently, a variety of snap together quick connect retainers have been used in place of the conventional methods. These quick connectors typically have a plurality of flexible legs which engage an annular bead attached to a male conduit and also engage an undercut groove formed within a female member. Two such examples are disclosed in U.S. Pat. No. 4,601,497 entitled "Swivelable Quick Connector Assembly" which issued on Jul. 22, 1986, and U.S. Pat. No. 4,778,203 entitled "Swivelable Quick Connector for High Temperature Connection" which issued on Oct. 18, 1988, both of which were invented by the inventor of the present invention and are incorporated by reference herewithin. Another quick connector is flat with pairs of annular arms extending therearound which are radially flexible. Other quick connectors which were invented by the inventor of the present invention are disclosed in U.S. Pat. Nos. 4,524,995 and 4,423,892, both of which are entitled "Swivelable Quick Connector Assembly" and which issued on Jun. 25, 1985, and Jan. 23, 1984, respectively, and are incorporated by reference herewithin.

While the aforementioned quick connectors present significant improvements in the art, each leg member of these devices must typically resist longitudinal pull out forces and must generate radial retention forces. Moreover, the legs are radially compressed during installation. Accordingly, in order to enhance the ability to either withstand forces in the longitudinal direction or generate radially directed forces, the part must often be compromised with regard to the other forces perpendicular thereto. Furthermore, the aforementioned quick connectors fail to provide a method by which proper connection of the male and female components may be readily determined. Therefore, it would be desirable to have a quick connector which can be easily installed and removed, is inexpensive to manufacture and which has separate segments for withstanding longitudinal pull out forces and generating radial retention forces, but which can be much shorter than conventional connectors by reducing the length inside the female portion of the connector to the length currently realized with threaded connectors. It is also desirable to have a quick connector that provides a feature by which the installer can verify that a proper connection has been made.

SUMMARY OF THE PRESENT INVENTION

In accordance with the present invention, a number of embodiments of a new and useful quick connector are provided to couple a male conduit within the bore of a female receptacle and to allow the installer to verify that the male and female components are properly connected. The quick connector has a pair of waist segments, a latch segment, a body segment with an aperture therein, and a leg or spring segment. The leg segment is defined by a pair of projecting elements which urge the waist segments radially outward for engagement with the female receptacle. The projecting elements are also partially compressible toward one another thereby allowing the pair of waist segments to be moved toward one another for installation and disassembly.

In one general embodiment, a confirmer ring is provided that is axially movable along the projecting elements between a lock-verifying or seated position and an unlocked or unseated position. After the quick connector of the present invention is moved to its receptacle-engaging position, the confirmer ring is moved from its unseated position to a seated position. Confirmation that the connector is properly locked in place is made when the ring is fully seated within a portion of the open end of the female receptacle.

In an alternate general embodiment, the confirmer ring does not slide relative to the projecting elements, but rather is relatively fixed. In this general embodiment the ring is still used to confirm the connection and is additional used to assist in installation.

These two general embodiments are presented in various forms that all incorporate the confirmer ring, a latch portion for engagement with a female component, and a spring portion for effecting engagement of the latch portion with the female component. The various forms of the present invention include:

1. A quick connector comprising a confirmer ring and a separate spring-latch combination, made from more than one type of material, where the ring prevents the disengagement of the latch portion from the female component;
2. a quick connector comprising a confirmer ring and a separate spring-latch combination, all made from more than one type of material, where the ring installs the spring-latch combination and confirms the correct installation of the male component in the female component;
3. a quick connector comprising a confirmer ring-spring combination of a first material and a latch portion of a second material;
4. a quick connector comprising a confirmer ring-latch combination of a first material and a spring portion of a second material; and
5. a quick connector comprising a unified ring-spring-latch combination.

The quick connector of the present invention offers several advantages over the prior art quick connectors. Among these advantages is that the waist segment and latch segment are optimized to withstand radially compressive insertion and removal forces while transmitting longitudinal retention forces that would otherwise separate male and female components in association with the female receptacle. Concurrently, the body segment is optimized to withstand longitudinal pull-out forces between the attached male conduit and the adjacent waist segments.

Furthermore, both the confirmer ring and the connector of the present invention can be easily attached and unattached from the female receptacle, thus providing an inexpensive-to-assemble system.

With respect to the first general embodiment, easy insertion is accomplished by axially moving the confirmer ring to its unseated position along the projecting elements of the connector, at least partially compressing the projecting elements of the leg segment toward one another by engagement against a lead-in chamfer in the female portion of the connector, inserting the body into the female receptacle, releasing compressive tension on the projecting elements whereby the compressed engaging lugs attached to the waist sections are expanded into a cavity having a larger diameter, and sliding the confirmer ring into its lock-verifying or seated position with the confirming ring in the lock verifying position in which the lock-in lugs cannot be uncoupled in this first embodiment.

Alternatively, and according to the second general embodiment, the confirmer ring does not slide, and by providing a graspable region, acts to assist in the installation of the male portion into the female portion of the connector. In this embodiment the confirmer ring still functions to confirm that the installation is properly made. The connection can be uncoupled with the confirmer ring in the forward position in its second form (as set forth above) and up to its fifth form (also as set forth above).

Additional advantages of the present quick connector over the prior art include low manufacturing costs and broad application. The latter advantage is evident in that the present quick connector is operable with most conventional non-swivelable and swivelable male conduits and with many traditional female receptacles so as to convert a rigidly fixed conduit of conventional threaded connectors to a swivel-type connection.

The quick connectors of the present invention have separated the springing radial requirement from the requirement to longitudinally abut a wall in the female receptacle. This is accomplished through use of the aforementioned legs as the springing member, through a separate springing member, or through a combination of the confirmer ring with a latch and spring. The quick connector of the present invention maintains the male conduit in alignment within the female receptacle thereby providing proper registry of a seal, the correctness of which can be easily verified by the confirmer ring.

The present invention is also beneficial since it allows the male conduit and female receptacle to incorporate longitudinally smaller sealing and retaining areas than those associated with traditional quick connect couplings.

BRIEF DESCRIPTION OF THE DRAWINGS

The above-noted advantages as well as other advantages of the present invention will become apparent to one skilled in the art by reading the following specification and subjoined claims in conjunction with reference to the following drawings in which:

FIG. 1 is an elevated side view showing a first preferred embodiment of a quick connector of the present invention in relation to interlocked male and female components with the confirmer ring not shown;

FIG. 2 is a top view of the embodiment of the present invention quick connector illustrated in FIG. 1;

FIG. 5 is a perspective view showing a preferred embodiment of the quick connector of the present invention with a spring-latch combination;

FIG. 6 is a perspective view showing a radial spring member portion of the embodiment shown in FIG. 5;

FIG. 7 is a perspective view showing a body segment of the embodiment shown in FIG. 5;

FIG. 6 is an isometric view of a wire form used in association with the retainer body of FIG. 15;

DETAILED DESCRIPTION OF THE PREFERRED EMBODIMENTS

In general, the present invention is directed to a connector for coupling a male tubular member or conduit to a female receptacle. The present invention finds utility in, for example, coupling the tubing disposed between elements of a hydraulic system. It may be used with plastic or metal conduit. The connector of the present invention also finds application in external oil lines and hoses as well as in hydraulic brake systems. The present connector may also be used in vehicle fuel systems between, for example, the fuel tank and the fuel pump and the fuel pump and the carburetor or fuel injection system.

While having particular usefulness in motor vehicles, the connector of the present invention may also find application in virtually any situation in which male and female fluid-carrying lines must be connected.

Very generally, FIGS. 1 through 10 illustrate an embodiment having a separate confirmer ring and a spring, connected permanently to a washer-shaped front body, that provides latching movement. FIGS. 11 through 14 illustrate an alternate embodiment of the connector of FIGS. 1 through 10 which provides a confirmer-installer ring with wire used as the combined spring-latch. The combined spring-latch of FIGS. 1 through 10 could be formed from wire, just as the combined spring-latch of FIGS. 11 through 14 could be formed from a stamped and formed strip of springy material. A separate confirmer ring is provided in the embodiments of FIGS. 1 through 14.

In the embodiments of FIGS. 15 through 18, the confirmer ring is combined with the springing function, and a separate wire form is attached to the combined confirmer ring-spring. To prohibit axial movement along the tube, the front (washer-shaped) body of the front body of FIGS. 1 through 14 include tabs that engage the combined confirmer ring-spring and assembled formed wire latch. The separation force between the male and female components is transferred by this front body from the male to the female.

Figure 19:
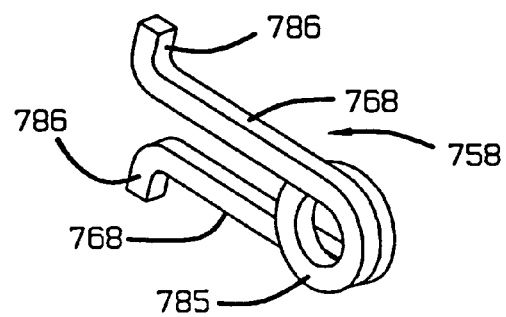
FIG. 19 is a spring usable in relation with an additional alternate embodiment of the confirmer ring of the present invention.
Figure 20:
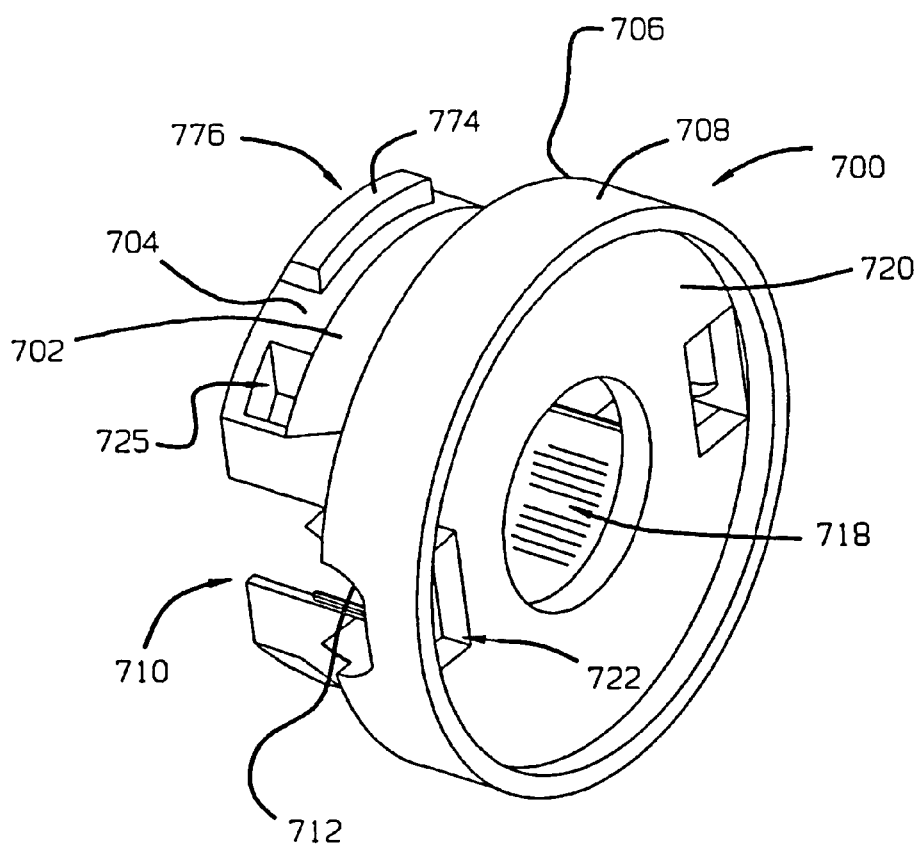
FIG. 20 is an isometric view of the additional alternate embodiment of the present invention having a confirms ring that incorporates the spring of FIG. 19.
Figure 21:
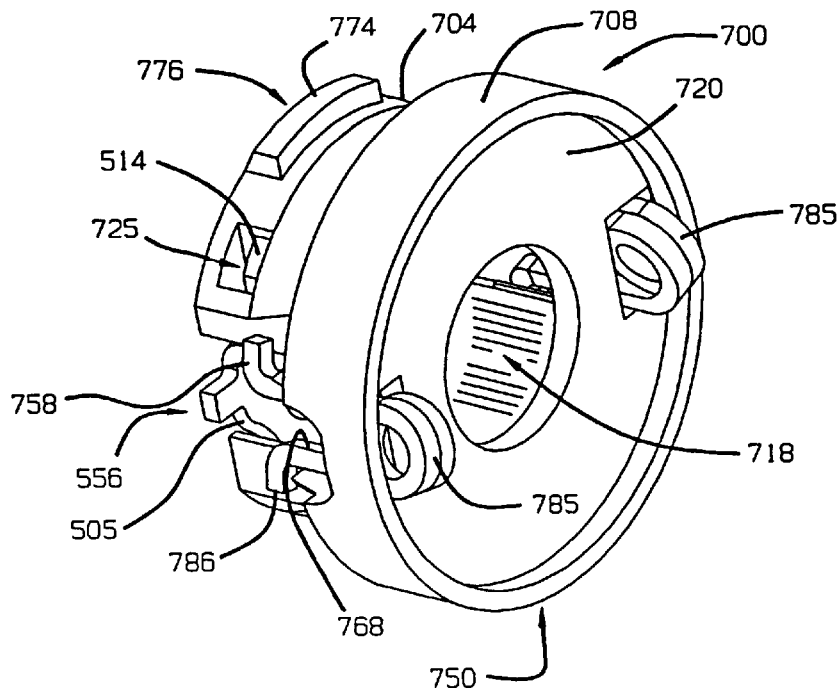
FIG. 21 is an isometric view of an additional alternate embodiment that comprises the spring of FIG. 19, the confirmer ring of FIG. 20, and the retainer body of FIG. 5.

In FIGS. 19 through 21 there is shown a quick connector assembly formed from a single type of material that combines the confirmer ring and latching characteristic, with a separate spring.

Figure 22:
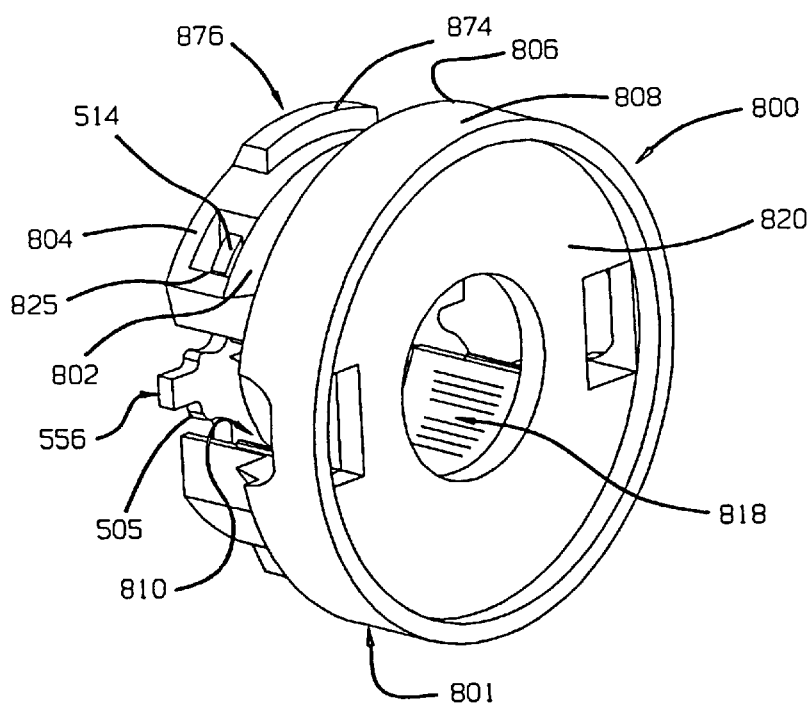
FIG. 22 is yet an additional embodiment of the quick connector assembly of the present invention in which the latch, the spring, and the ring body are composed of a single type of material.

In FIG. 22 an embodiment of the present invention is illustrated which comprises a confirmer ring, a latch portion, and a spring portion that are all formed from the same type of material.

Figure 23:
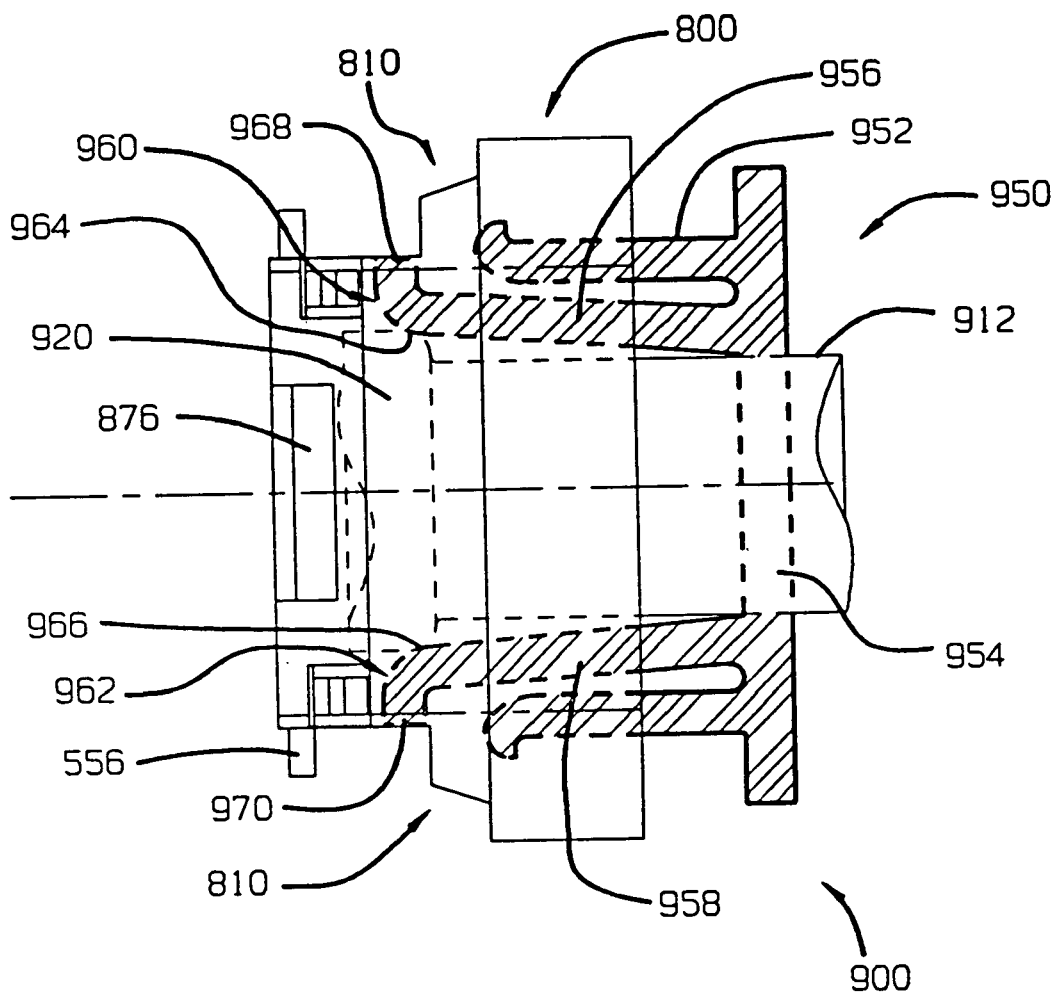
FIG. 23 is a sectional top view of an embodiment of a method of preventing the disengagement of the male portion of the connection from the female portion of the connection.

In FIG. 23 there is shown a device that prevents the disengagement of the male and female portions of the connector after the male portion with confirmer ring has been engaged and locked into the female receptacle. This is a separate device (a removal-preventing element) which is moved into a detented position, thus inhibiting movement of the latching lugs, thereby locking the male portion to the female receptacle to prevent the uncoupling of the male from the female portion. This preventing element must be moved away from its detented position to allow decoupling.

While the embodiments of FIGS. 1 through 22 can be formed in a variety of ways, each of the varied embodiments provides a device that is captured by the male, and confirms that a connection has been properly made in FIGS. 3 and 5 through 22.

With specific reference to FIGS. 1 through 10, a preferred embodiment of a quick connector 10 is used to operably retain a swivelable male conduit 12 to a female receptacle 14. A preferred embodiment of the male conduit 12 comprises a rigid metallic member having a connecting portion 20, a bulged portion 22, a coined recessed portion 24 and a flanged portion 26 proximate with a flange 28. The male conduit 12 further has a circumferentially attached annular bead or bushing 30 and a sealing ring 32. An O-ring seal 32 and an annular washer 30 are longitudinally juxtapositioned between the bushing 34 and the flanged portion 26 so as to circumferentially surround the recessed portion 24. The bead or bushing 34 is combinable with the flanged portion 26 or can be locked to the conduit 12. The bushing 30 may also be integral with conduit 12. In coordination therewith, the female receptacle 14 (shown in FIG. 3 in cross section) has an outboard face 36, a frusto-conical chamfered lead-in section 38, an annular ridge section 40, a retaining formation or, more specifically, an internal cavity 42 within which there is an outboard abutting wall 44 and an inboard abutting wall 46, a frusto-conical median section 48, a bore 50 defined by a cylindrical inside surface, and a passageway 52.

The quick connector 10 is defined by a radial member 54 and a body segment 56, and, as can best be observed in FIGS. 5 through 8, the radial member 54 further has a pair of latch segments 58, a plurality of waist segments 60, 62, 64, and 66, and a pair of leg segments 68. Each latch segment 58 has a flange 70 on which is formed an intermediate area 72 having an interface portion 74. Moreover, each leg segment 68 has a pair of projecting elements 76 which project perpendicularly from each adjacent waist segments 60, 62, 64, and 66. According to the present preferred embodiment, each projecting element 76 is a formed flat metal strip. Furthermore, each projecting element 76 has a first outwardly offset formation 80, an adjacent inwardly offset formation 82, and a second outwardly offset formation 84 proximate with a truss element 86.

Waist segments 60, 62, 64, and 66 define an opening 88 which has two partially cylindrical interior edges 90 and four corner areas 92. Each latch segment 58, the adjacent waist segments 60, 62, 64, and 66, and the adjacent pair of projecting elements 76 are separated from the symmetrically opposing latch segment 58, waist segments 60, 62, 64 and 66, and projecting elements 76, by a pair of gaps 94. Accordingly, the leg segments 68 can be radially compressed toward one another such that latch segments 58 are radially translatable toward each other. The leg segments 68 and the projecting elements 76 are configured in a springing manner to urge the latch segments 58 outward away from one another.

Referring primarily to FIG. 7, the body segment 56 has a pair of substantially flat faces 96 and 98 bordered by an annular peripheral edge 105 and an internal aperture 102 defined by an inner edge. Four bendable tabs 104 also project from the inner edge surrounding aperture 102. When the body segment 56 is assembled to the radial member 54, the face 98 is mounted adjacent to the waist segments 60, 62, 64 and 66. The tabs 104 of the body segment 56 are then aligned with the corner areas 92 of the radial member 54 and are folded over upon a portion of each waist segment 60, 62, 64, and 66 proximate with the leg segments 68. Nevertheless, a space 106 is present between an edge 108 of each tab 104 and the abutting wall of corner area 92. This allows the waist segments 60, 62, 64, and 66 and the latch segments 58 to be radially translatable toward one another between the tabs 104 and the aperture 102 of the body segment 56. According to the first preferred embodiment, both the radial portion 54 and the body segment 56 are preferably stamped from a sheet of metallic material such as stainless steel.

Figure 3:
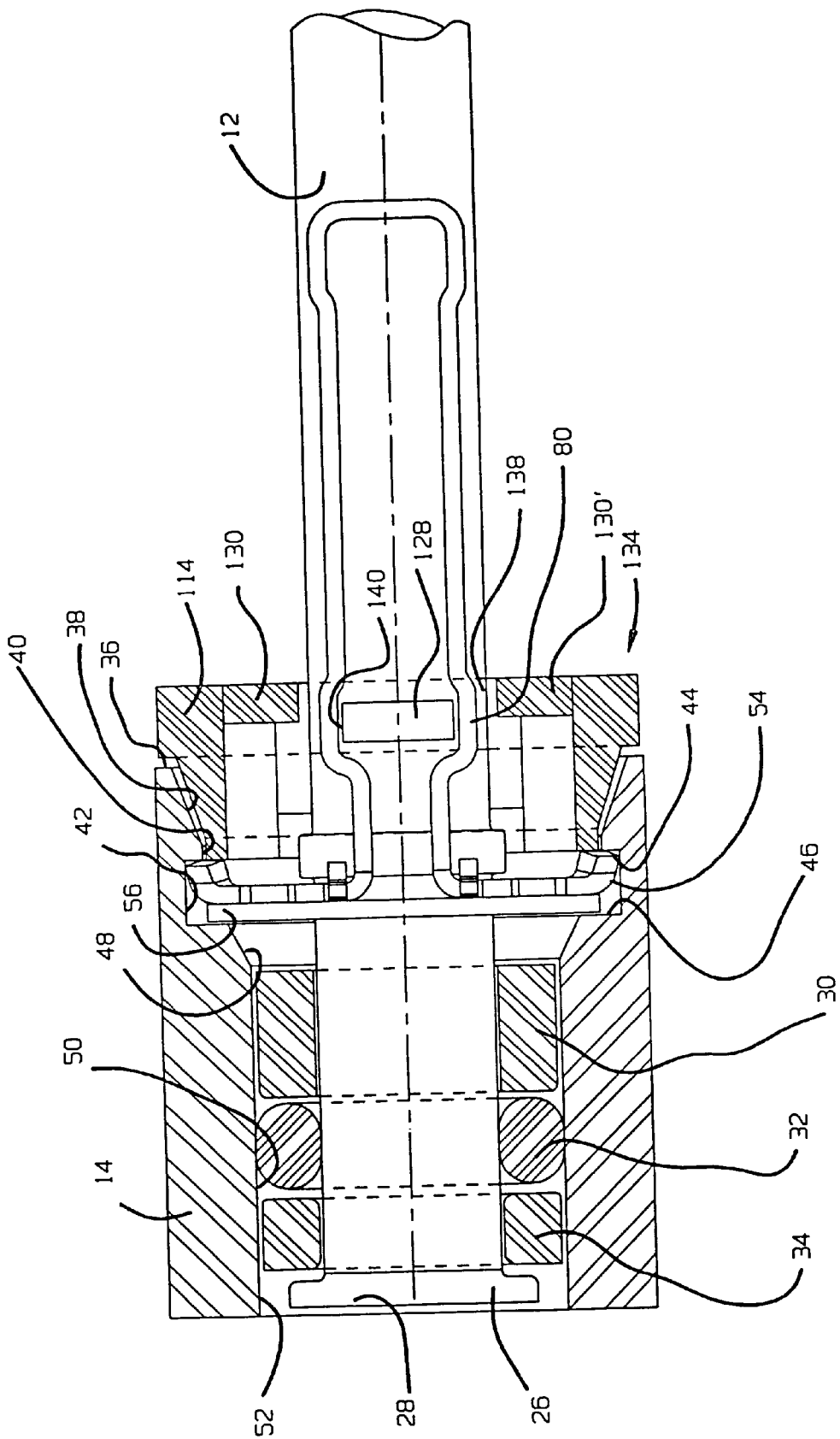
FIG. 3 is a sectional view of the embodiment of the quick connector of the present invention shown in FIG. 1 in relation to a male conduit and a female receptacle with the confirmer ring and a spring-latch combination.
Figure 4:
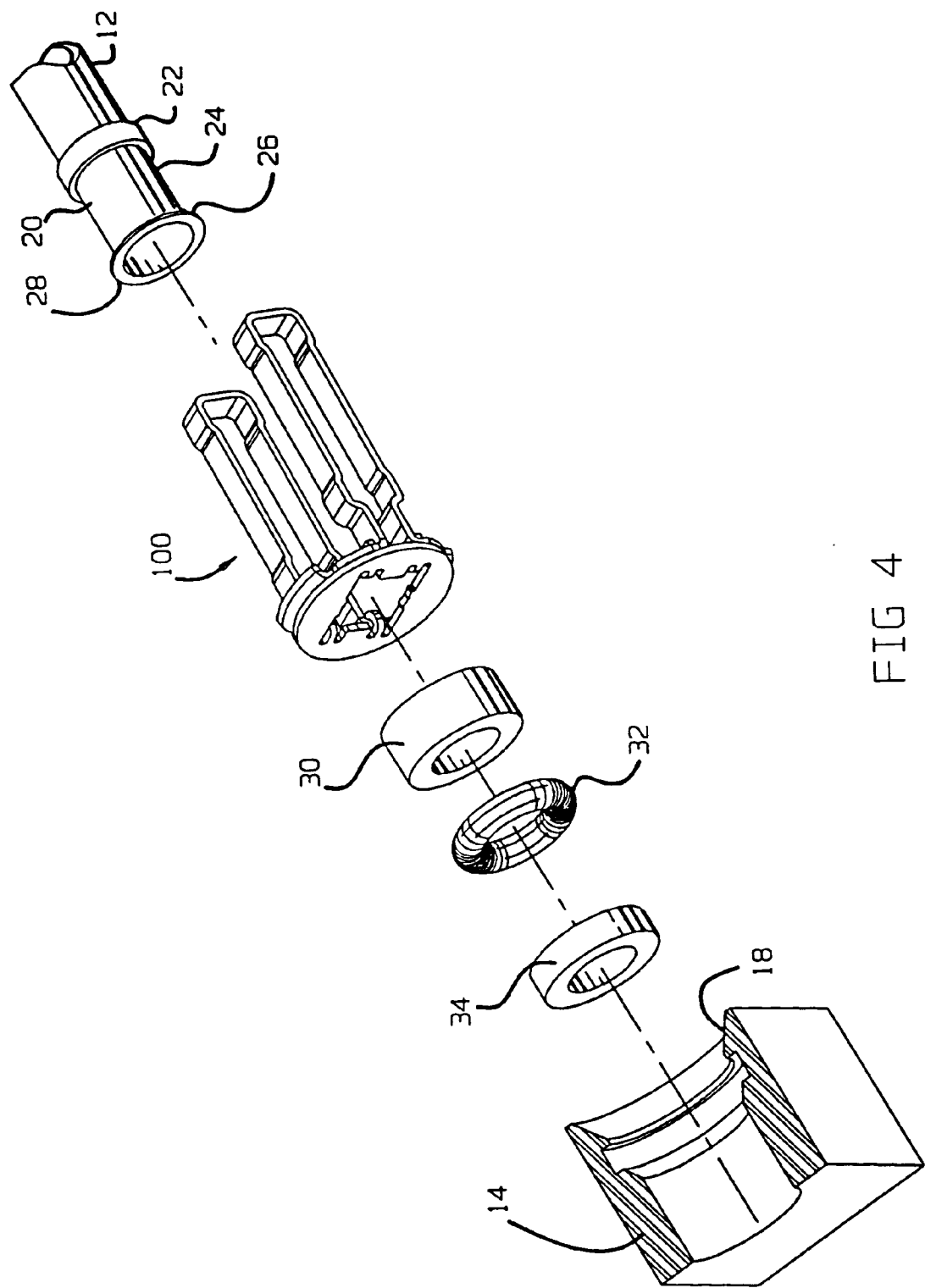
FIG. 4 is an exploded view of the quick connector embodiment of FIG. 1 situated between male and female components.
Figure 8:
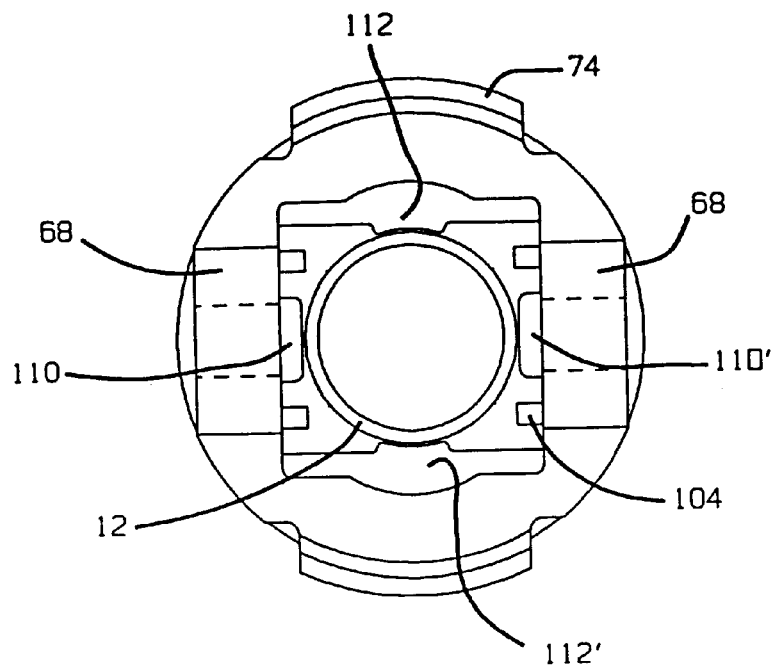
FIG. 8 is an end view of the first preferred embodiment of the present invention quick connector as seen from the radial member.

The aperture 102 of the body segment 56 circumferentially surrounds the male conduit 12 and is longitudinally trapped between the bulged portion 22 and the bushing 30. This is best shown in FIG. 3. Movement of the body segment 56 and hence the aperture 102 away from its location on the conduit 12 is prohibited by a length of tube having a larger than standard outside diameter formed away from the tube opening, or by a plastic flexible tubing (such as a liner) which may also include the front bushing and which can be used to expand the walls of the flexible plastic tube by being forced into a non-expanding aperture 102.

Furthermore, the peripheral edge 105 of the body segment 56 has a smaller diametric dimension than does the annular ridge section 40 and the internal cavity 42 of the female receptacle 14. Accordingly, the body segment 56 serves as a longitudinal and radial retention means between the male conduit 12 and the radial member 54. During insertion of the radial member 54 into the female receptacle 14, the chamfered section 38 serves to radially compress the shoulder segments 58 toward one another. Subsequently, the leg segments 68 urge the shoulder segments 58 radially outward to engage the internal cavity 42. The interface portion 74 of each shoulder segment 58 operably engages the abutting wall 46 of the female receptacle 14. Thus, the radial member 54 is designed to provide radially expansive retention forces to retain the body segment 56 to the female receptacle 14. The combination of wall 46 and expanded area 22 of conduit 12 prevents the male from going too far into the female.

In addition to serving as a longitudinal and radial retention means between the male conduit 12 and the radial member 54, the body segment 56 also provides support for the male conduit 12 within the female receptacle 14. A pair of opposed positioning tabs 110, 110' are formed as walls partially disposed about the internal aperture 102, as are a pair of opposed positioning tabs 112, 112'. The tabs 110, 110' and the tabs 112, 112' are adjacent the coined recessed portion 24 of the male conduit 12. These tabs also serve to interact with a flexible plastic tube to lock body segment 56 to the outside surface of the plastic tube when the tube is expanded by the liner (not shown).

One of the principal features of the present invention is a confirmer ring 114 that allows the installer to easily and quickly verify whether or not a proper connection has been made between the male conduit 12 and the female receptacle 14.

Figure 9:
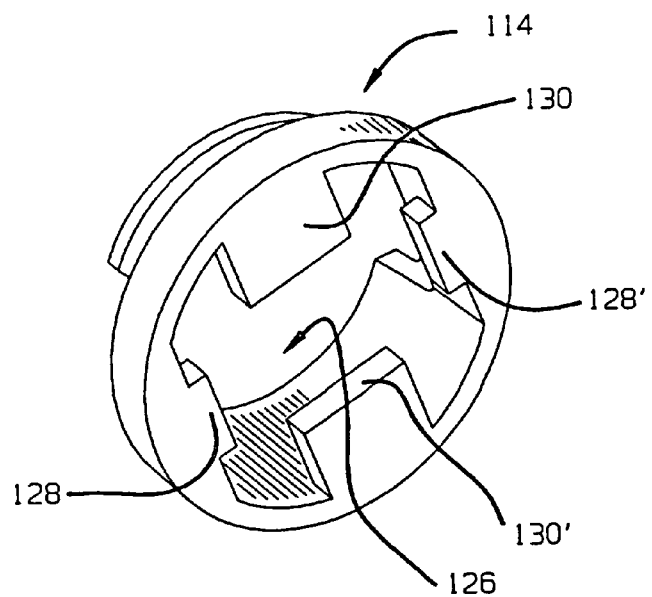
FIG. 9 is a perspective view of a confirmer ring for use with the spring portion of the legs of the previous figures.
Figure 10:
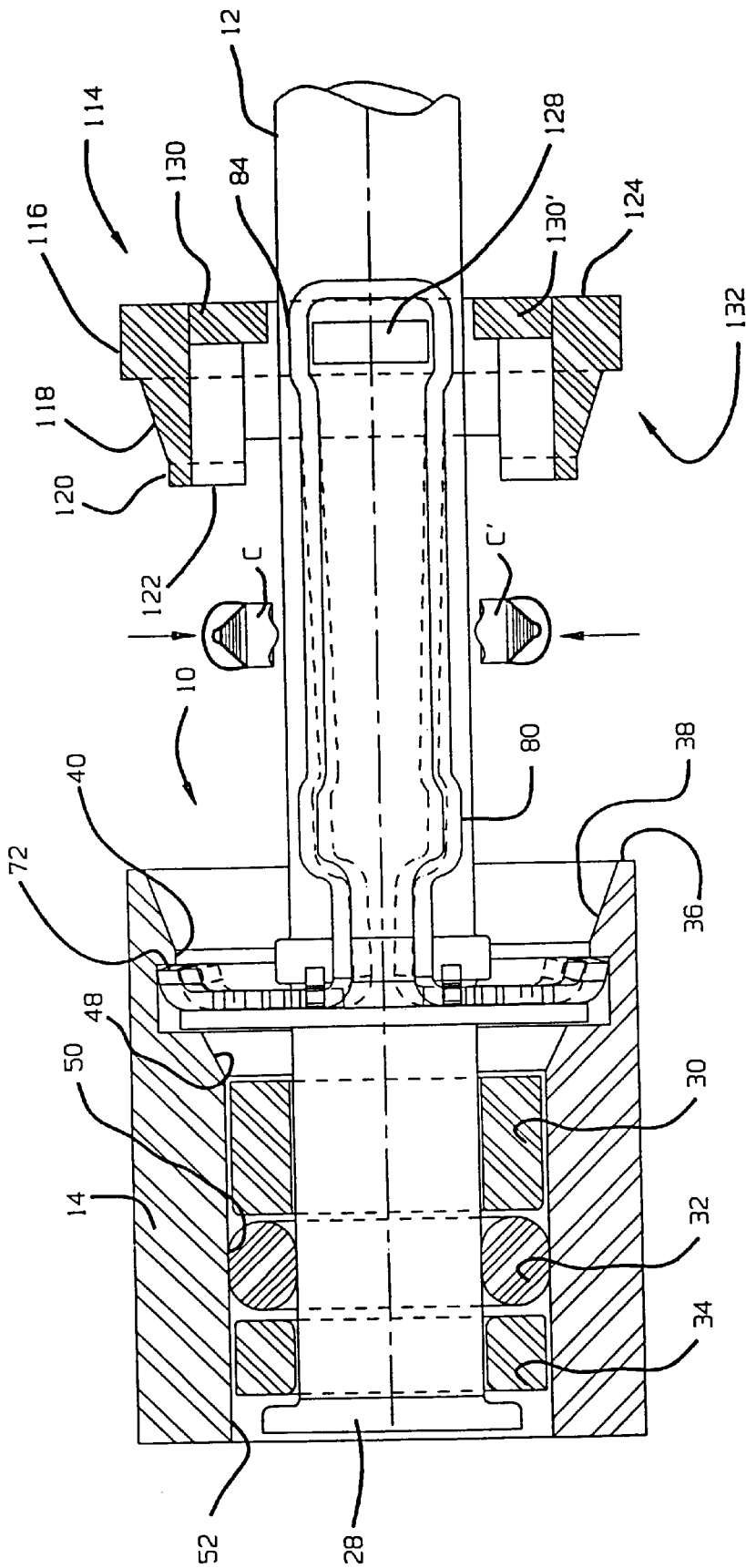
FIG. 10 is a sectional view similar to that of FIG. 3 but showing the confirmer ring positioned in spaced apart relation from the female receptacle.

The confirmer ring 114, seen in perspective in FIG. 9 and in cross-section in FIG. 10, includes a cylindrical drum section 116, a frusto-conical median section 118, and a cylindrical shoulder 120. The shoulder 120 terminates at and is adjacent with an inboard end wall 122. Opposite the inboard end wall 122 and adjacent the drum section 116 is an outboard end wall 124. As best illustrated in FIG. 9, within the outboard end wall 124 is defined an aperture 126. Formed along the wall defining the aperture 126 are pairs of opposed fingers 128, 128' and 130, 130'. Each of the fingers 128, 128' is disposed between opposed arms that form the leg segments 68, as illustrated in FIGS. 3 and 10. The confirmer ring 114 is preferably composed of a polymerized material such as Celcon (trademark for an acetal copolymer produced by Celanese Chemical Corp.) or a nylon.

The confirmer ring 114 is axially slidable between an unseated position 132 (shown in FIG. 10) and a seated position 134 (shown in FIG. 3). In its unseated position 132, the fingers 128, 128' are generally disposed between the opposed portions of the leg segment 68 that define the second outwardly offset formation 84. While in this position, the installer squeezes together opposed portions of the leg segments 68 using either his fingers or a tool such as pliers (partially shown as compressing members C and C'), thus moving together opposed portions of the shoulder segments 58. The combined radial member 54 and body segment 56 are inserted into the female receptacle 14, and when the body segment 56 abuts the inboard abutting wall 46. If fully seated against the wall 46, the interface portion 74 of the radial member 54 locks against the outboard abutting wall 44, thus preventing outward movement of the connector 10. The confirmer ring 114 is then moved from its unseated position 132 axially to its seated position 134, as shown in FIG. 3. Between these two positions each of the fingers 128, 128' are moved between the two opposed portions of the leg segment 68 that define the adjacent outwardly offset formations 80 and 84. The outwardly offset formations 80 and 84 act as detents for fingers 128 and 128'.

The frusto-conical median section 118 of the confirmer ring 114 is contoured so as to mate with the frusto-conical chamfered lead-in section 38 of the female receptacle 14. Similarly, the shoulder 120 is contoured so as to enter the annular ridge section 40 and the retainer assembly 100 (shown in FIG. 5) and pass the abutting wall 44 before it is stopped by the face 36 of the female receptacle 14. If the male conduit 12 is correctly seated within the female receptacle 14, the frusto-conical median section 118 and the shoulder 120 of the confirmer ring 114 will fully nest within the opening 18 of the female receptacle 14. Once in this correct position, the axial section 116 of the ring 114 will be uniformly adjacent the outboard face 36 of the female receptacle 14. This correct position can be determined by the installer by observation or touch. If the confirmer ring 114 does not rest evenly, then the connection between the male conduit 12 and the female receptacle 14 is incorrect and a reconnection must be made.

According to the embodiment of the confirmer ring illustrated in FIGS. 3 and 10 (FIG. 9 is a generic representation of the ring 114 for the embodiments discussed herein), the removal of the connector 10 and the subsequent disconnection of the male conduit 12 from the female receptacle 14 cannot be effected until after the confirmer ring 114 has been withdrawn. This feature is a result of the size of the gap between the outwardly offset formation 80 of arms 68 shown in FIG. 6 and the width of fingers 128 shown in FIG. 9. This relationship is best seen in FIG. 3. As illustrated, the gaps 140 between the finger 128 (and likewise, the finger 128') and the inner walls of the offset formation 80 are relatively narrow. The gaps 138 between fingers 130 and 130' and conduit 12 are relatively narrow.

In FIGS. 11 through 14, a second embodiment of the present invention is shown, generally illustrated as 210. As with the connector 10, portions of the connector 210 could be made using strip or wire. A method of urging the interface walls 276 into contact with the female abutting wall (element 44 in FIG. 3) is provided by a spring used in the embodiments shown in the several figures. While the connectors 10 and 210 are preferably constructed of a metal, the quick connectors of FIGS. 15 through 17 disclose embodiments that incorporate a spring that may also be of plastic.

Figure 13:
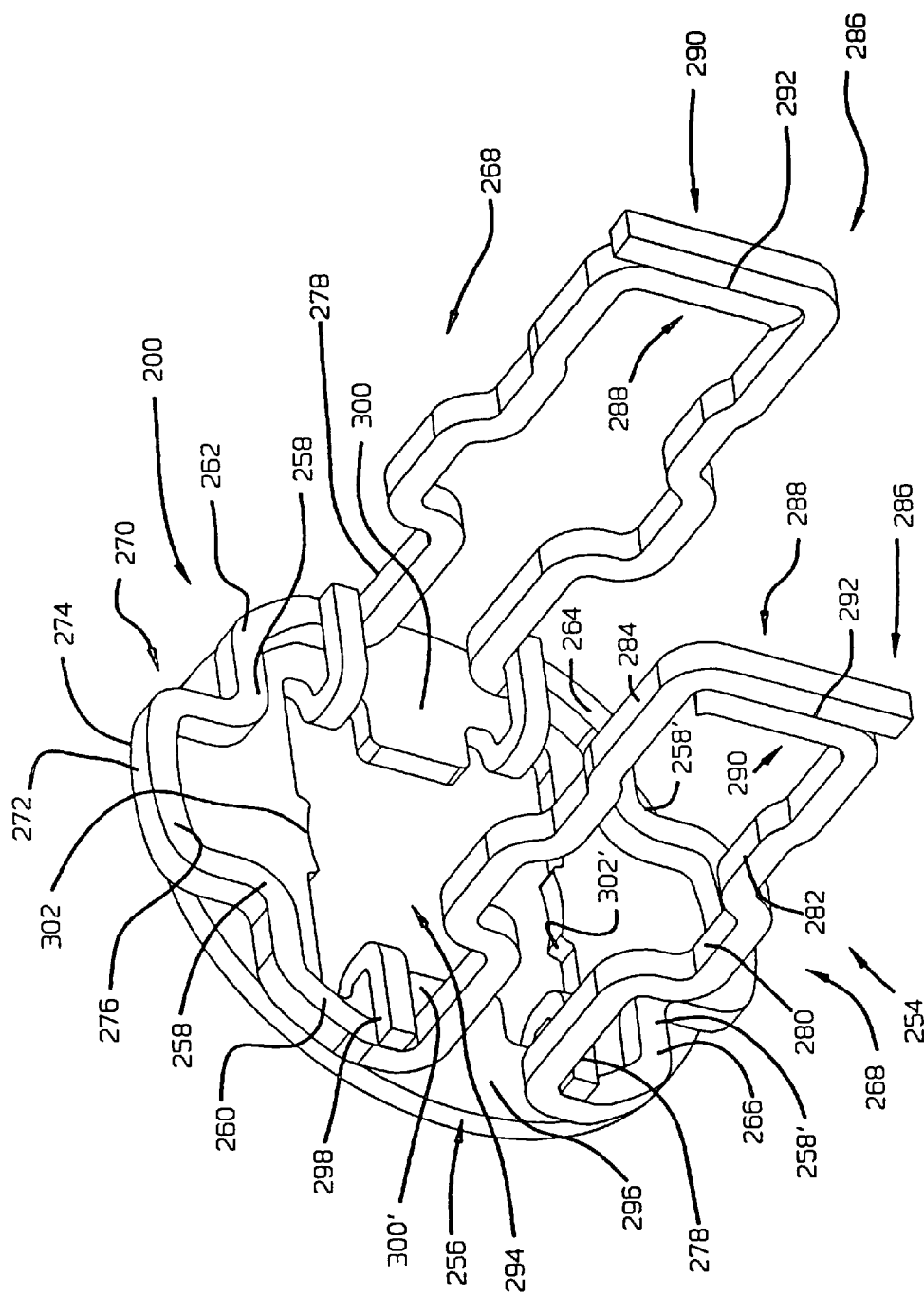
FIG. 13 is a perspective view showing a different preferred embodiment of the quick connector of the present invention.

The quick connector 200 is defined by a radial member 254 and a body segment 256. As illustrated in FIG. 13, the radial member 254 further has opposing pairs of shoulder segments 258 and 258', a plurality of waist segments 260, 262, 264, and 266, and a pair of leg segments 268. Each shoulder segment 258 (as well as each shoulder segment 258') has extending therefrom a latch member 270 having an interlocking segment 272 on which is formed interface walls 274 and 276. The interface wall 276 locks to the abutting wall 244 when the male conduit is locked into the female conduit. Moreover, each leg segment 268 has a pair of projecting elements 278 which project perpendicular from each adjacent waist segment 260, 262, 264, and 266. Like its counterpart described above with respect to FIGS. 1 through 10, each projecting element 278 has a first outwardly offset formation 280, an adjacent inwardly offset formation 282, and a second outwardly offset formation 284 proximate with a distal end 286.

The radial member 254 may be composed of a single formed wire or may be formed of two formed wire pieces as illustrated. The embodiment shown comprises a first half 288 and a second half 290. The halves 288 and 290 are fixed to each other at weld spots 292. The halves 288 and 290 mostly function as a spring which urges the interface walls 274 apart.

As with the radial member 54 described above, the segments 272 of the present embodiment can be radially compressed toward one another such that the pair of shoulder segments 258 are radially translated toward the pair of shoulder segments 258'. The leg segments 268 are also configured to urge the opposing pair of shoulder segments 258 and 258' outward away from one another.

With respect to the body segment 256, its construction is substantially identical to that of the body segment 56 discussed above with respect to FIGS. 1 through 10. An aperture 294 is centrally defined within the body 296 of the segment 256. Four bendable tabs 298 also project from the inner edge surrounding aperture 294. When the body segment 256 is assembled to the radial member 254, the segment 256 is mounted adjacent to waist segments 260, 262, 264, and 266 opposite from leg segments 268. Tabs 298 of the body segment 256 are then aligned with the radial member 254 and are folded over upon a portion of each waist segment 260, 262, 264, and 266 proximate with leg segments 268.

Figure 11:
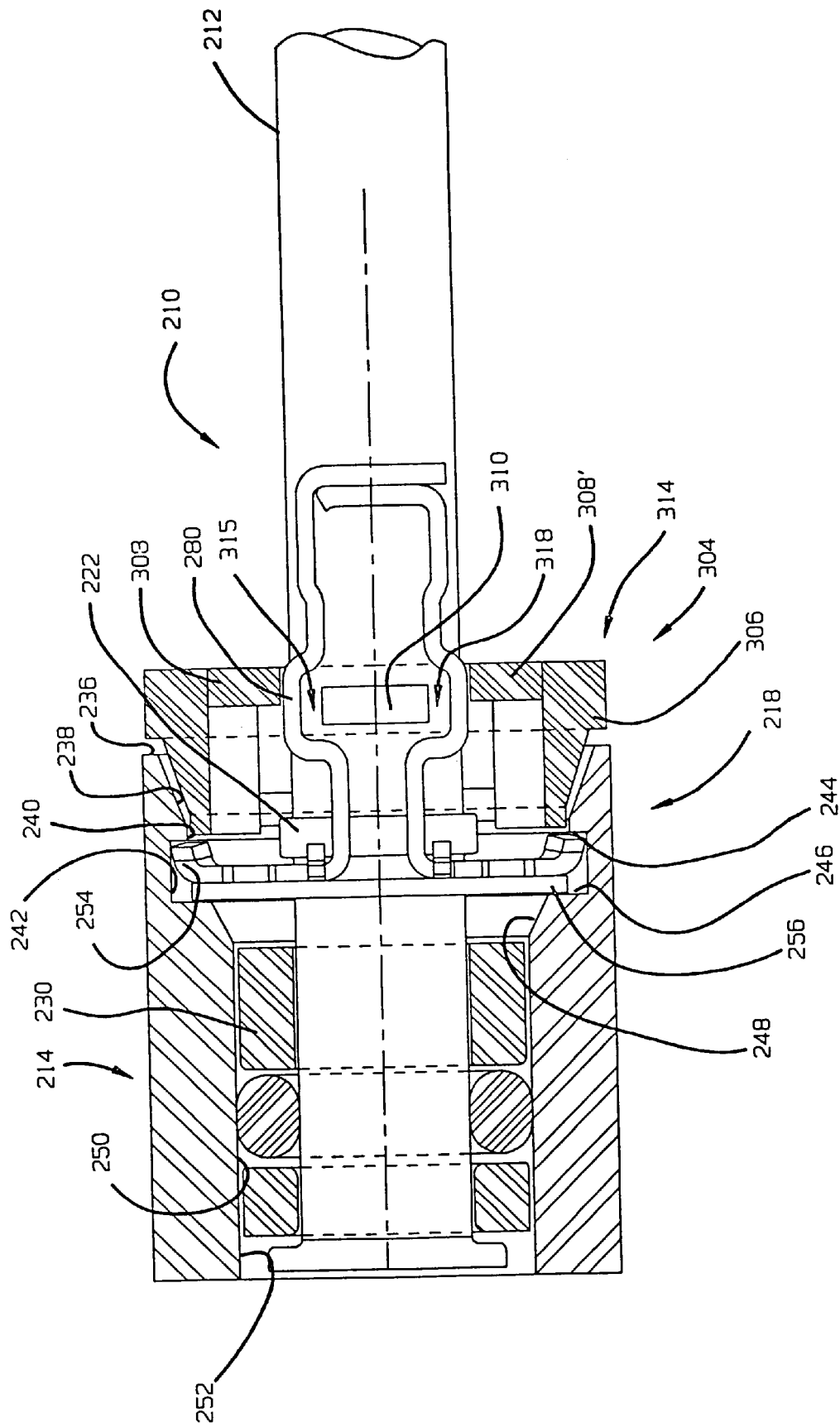
FIG. 11 is a sectional view of another preferred embodiment of the present invention quick connector in relation to the male conduit and the female receptacle.
Figure 12:
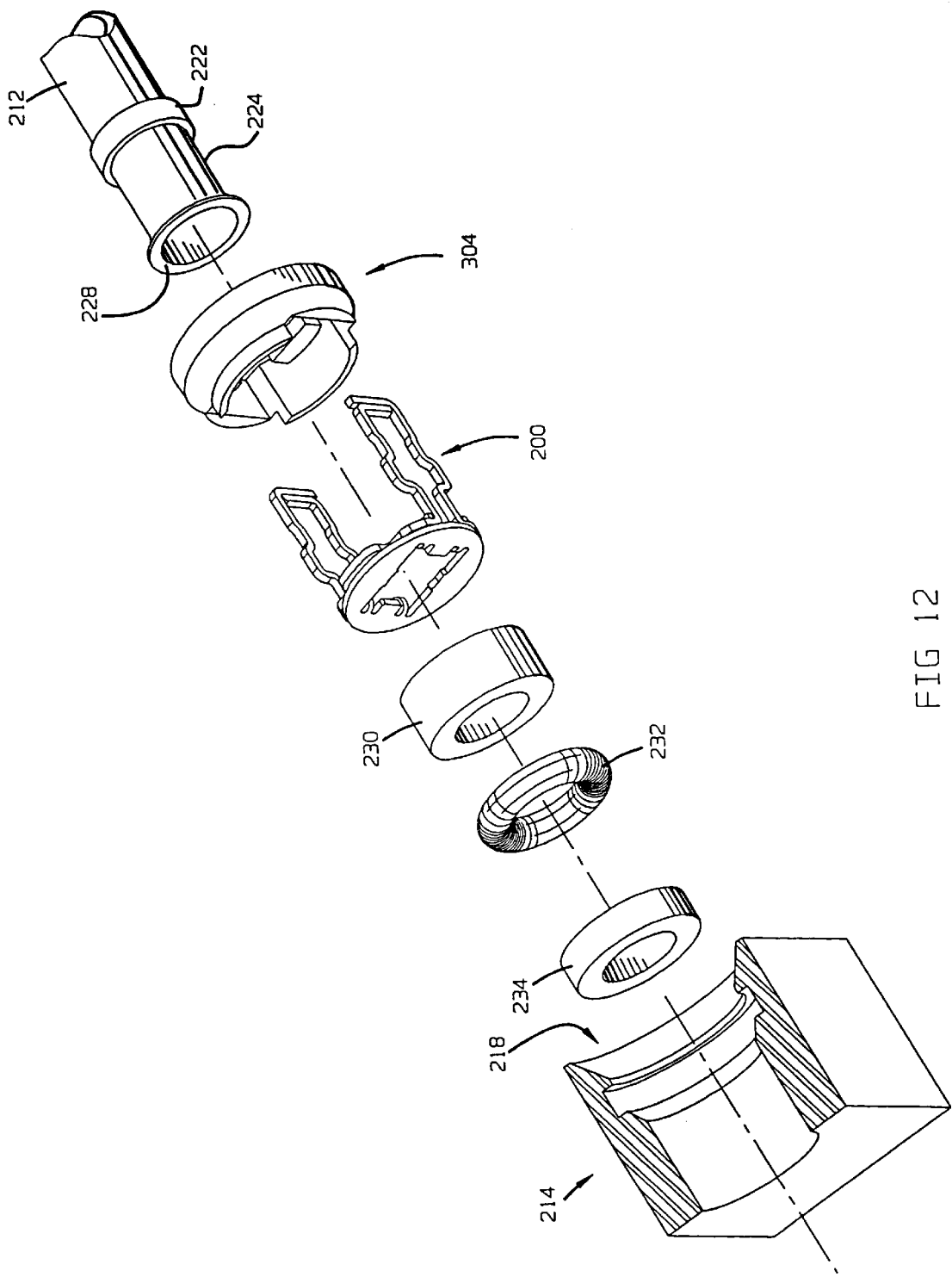
FIG. 12 is an exploded view of the quick connector embodiment of FIG. 11 situated between the male and female components.

The body segment 256 circumferentially surrounds the male conduit 212 and is longitudinally trapped between the bulged portion 222 and bushing 230, as best shown in FIGS. 11 and 12. When used with flexible plastic tubing (in another embodiment [not shown]), the body segment 256 is captured by the action of an expanding tube liner, which may include the front bushing 234 and expanded area 222. This is best shown in FIG. 12.

As with the above-discussed embodiment, the body segment 256 serves as a longitudinal and radial retention means between the male conduit 212 and the radial member 254. The receptacle 214 includes an outboard face 236, an entry frusto-conical section 238, an annular ridged section 240, an internal cavity 242 within which is formed outboard abutting wall 244 and inboard wall 246, a frusto-conical median section 248, a bore 250 defined by a cylindrical inside surface, and a passageway 252. During insertion of the radial member 254 within female receptacle 214, the chamfered section 238 serves to radially compress the opposing pair of shoulder segments 258 and 258' toward one another. Subsequently, the leg segments 268 urge the opposing pair of shoulder segments 258 and 258' radially outward to engage the undercut groove 242. The interface wall 276 of each pair of shoulder segments 258 and 258' operably engages the abutting wall 244 of the female receptacle 214. Thus, as with the embodiment of FIGS. 1 through 10, the radial member 254 is designed to provide radially expansive retention forces to retain the body segment 256 to female receptacle 214.

The body segment 256 also provides support for the male conduit 212 within the female receptacle 214. A pair of opposed positioning tabs 300, 300' are formed as walls partially disposed about the aperture 294, as are a pair of opposed positioning tabs 302, 302'.

As illustrated, the present embodiment also employs a confirmer-installer ring 304 that allows the installer to easily and quickly verify whether or not a proper connection has been made between the male conduit 212 and the female receptacle 214 as well as install the male conduit 212 into the female receptacle 214.

Figure 14:
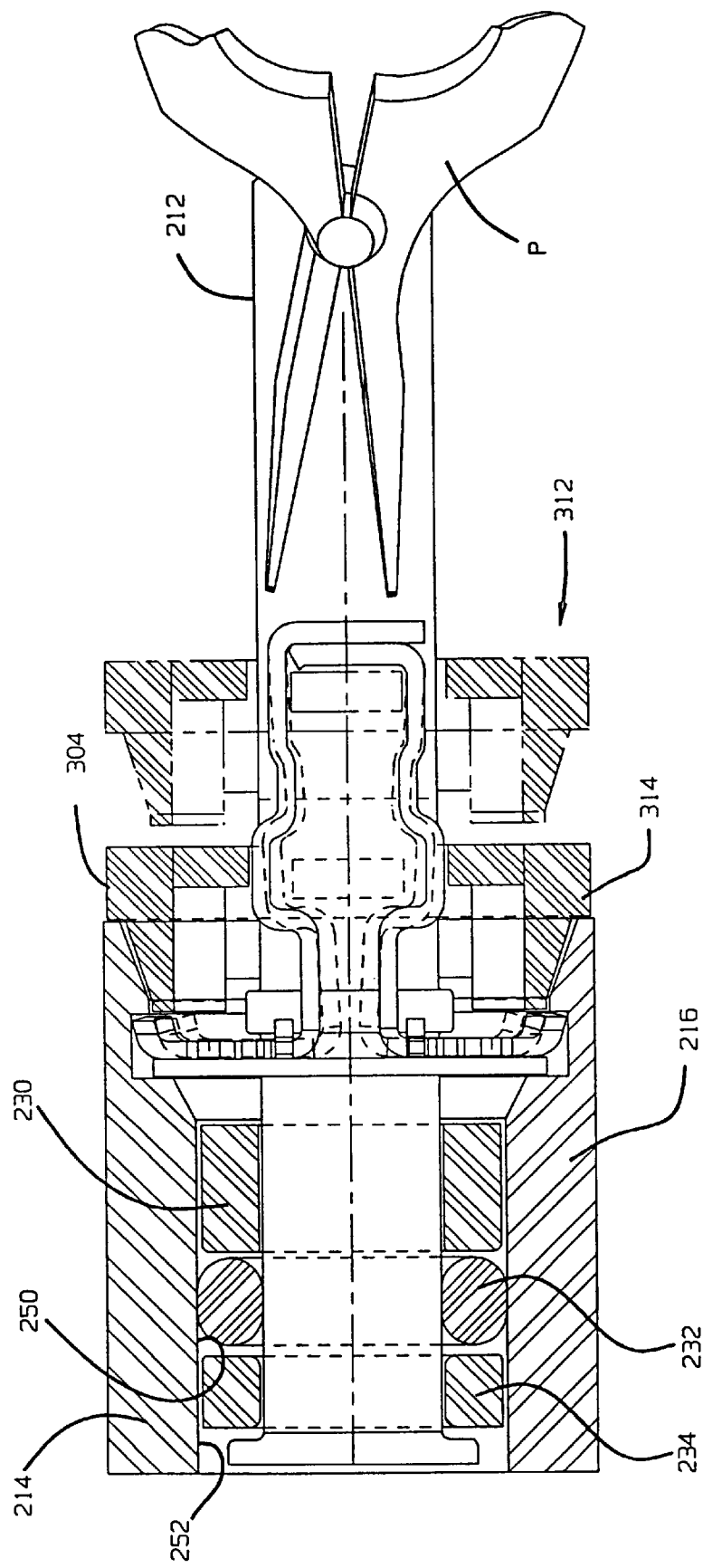
FIG. 14 is a sectional view similar to that of FIG. 11 but showing a pair of pliers to remove the quick connector from the female component.
Figure 15:
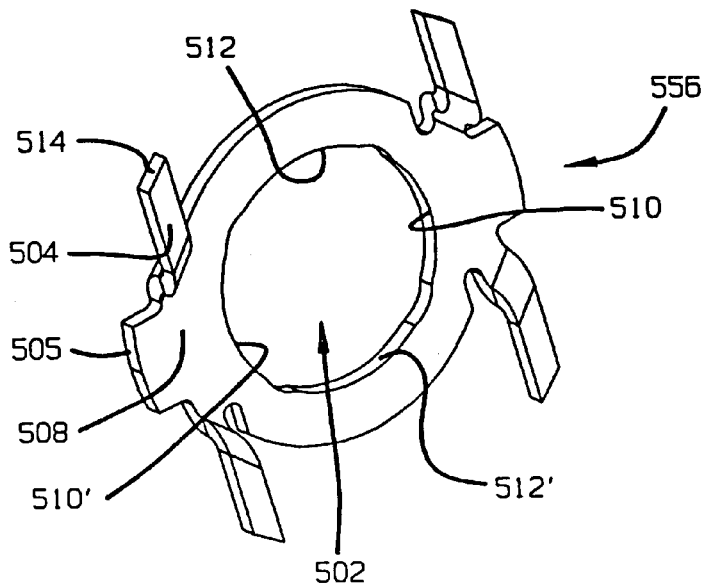
FIG. 15 is an isometric view of a retainer body of an alternate embodiment.

The confirmer-installer ring 304, shown in cross-section in FIGS. 11 and 14, has an external proportion that is substantially identical to the ring 114 discussed above. Within the body 306 of the ring 304 and extending from a central aperture are pairs of opposed formations 308, 308' and finger 310 (the latter having an opposed twin unseen in the figures). Each of the formations 308, 308' is disposed between opposed arms that form the leg segments 268, as illustrated in FIGS. 11 and 14.

Like the above-described embodiment, the confirmer-installer ring 304 is axially slidable between an unseated position 312 (shown phantomed in FIG. 14) which is only used to assemble ring 304 to legs 268, and a seated position 314 (shown in FIG. 11). In its unseated position (shown phantomed), the finger 310 and its unseen twin is generally disposed between the opposed portions of the leg segment 268 that defines the second outwardly offset formation 284. As may be understood, the outwardly offset opening of formation 280 is larger than the outwardly offset formation 284. This prevents the formation 280 from being locked against the finger 310 and its unseen twin before the wall 276 is completely disengaged from the abutting wall 244. While in this seated position, the installer squeezes together opposed portions of the leg segments 68 using either his fingers or a tool such as pliers partially shown as pliers P, thus moving together the opposing pairs of shoulders 258 and 258'.

Insertion of the connector 210 is as above with the combined radial member 254 and body segment being inserted into the female receptacle 214 as shown in FIG. 11. This allows the confirmer ring 114 (FIG. 3) to be used as a confirmer-installer ring because there is sufficient gap between the finger 310 and its unseen twin and the formation 280 of the leg segments 268 to allow the locking and unlocking of the wall 276 against the area 244.

If the male conduit 212 is correctly seated within the female receptacle 214, the contoured portion of the confirmer ring 304 fully nests within the opening 218 of the female receptacle 214. The correct position can be determined by the installer by observation or touch. If the confirmer ring 304 does not rest evenly against the body of the receptacle 214, then a reconnection must be made.

According to the present embodiment of the confirmer-installer ring 304, the removal of the connector 210 and its associated male conduit 212 from the female receptacle 214 is possible regardless of the position of the confirmer-installer ring 304. As is understood, this design is opposite that set forth in the previously discussed embodiment. As illustrated in FIG. 11, gaps 315 and 318 are defined between the finger 310 and the formation 280 and the twin of the finger 310 and the formation 280' (not shown).

It may be apparent that many previously-discussed elements are alike or are substantially similar in both design and function to elements of the remaining figures. These elements include: Connectors 10 and 210; male conduits 12 and 212; female receptacle 14 and 214; bulged portions 22 and 222; recessed portions 24 and 224; flanges 28 and 228 (or a combination of flanges 28 or 228 and bushings 34 or 234 that are formed on conduit 12 or 212, or are part of a liner that is installed in the interior of a plastic conduit, all not shown); annular bushings 30 and 230; ridge sections 40 and 240; lead-in chamfer areas 38 and 238; annular ridge sections 40 and 240; internal cavities 42 and 242; and outboard abutting walls 44 and 244. Accordingly, and with respect to the remaining FIGS. 15 through 22, reference may be made, for example, to "connector 10", but it is to be understood that the specified element could as easily be "connector 210". Only one of two like elements will be identified and discussed to avoid confusion.

Figure 16:
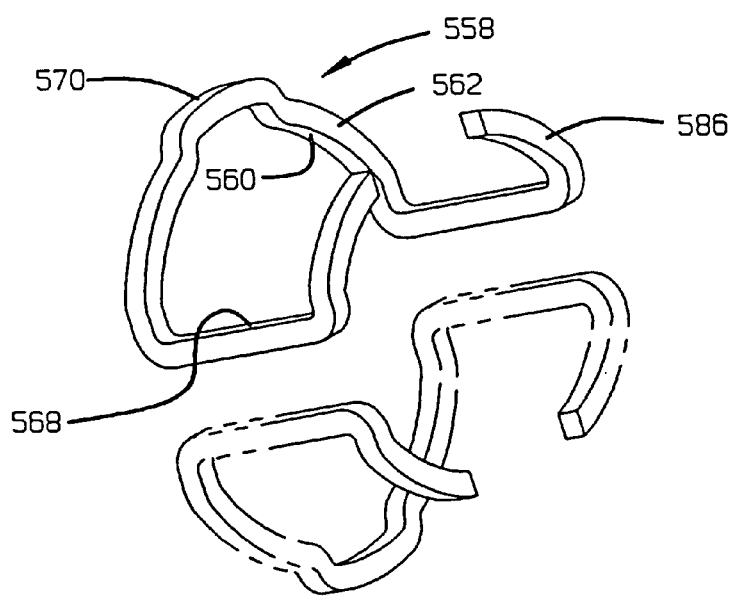
Figure 17A:
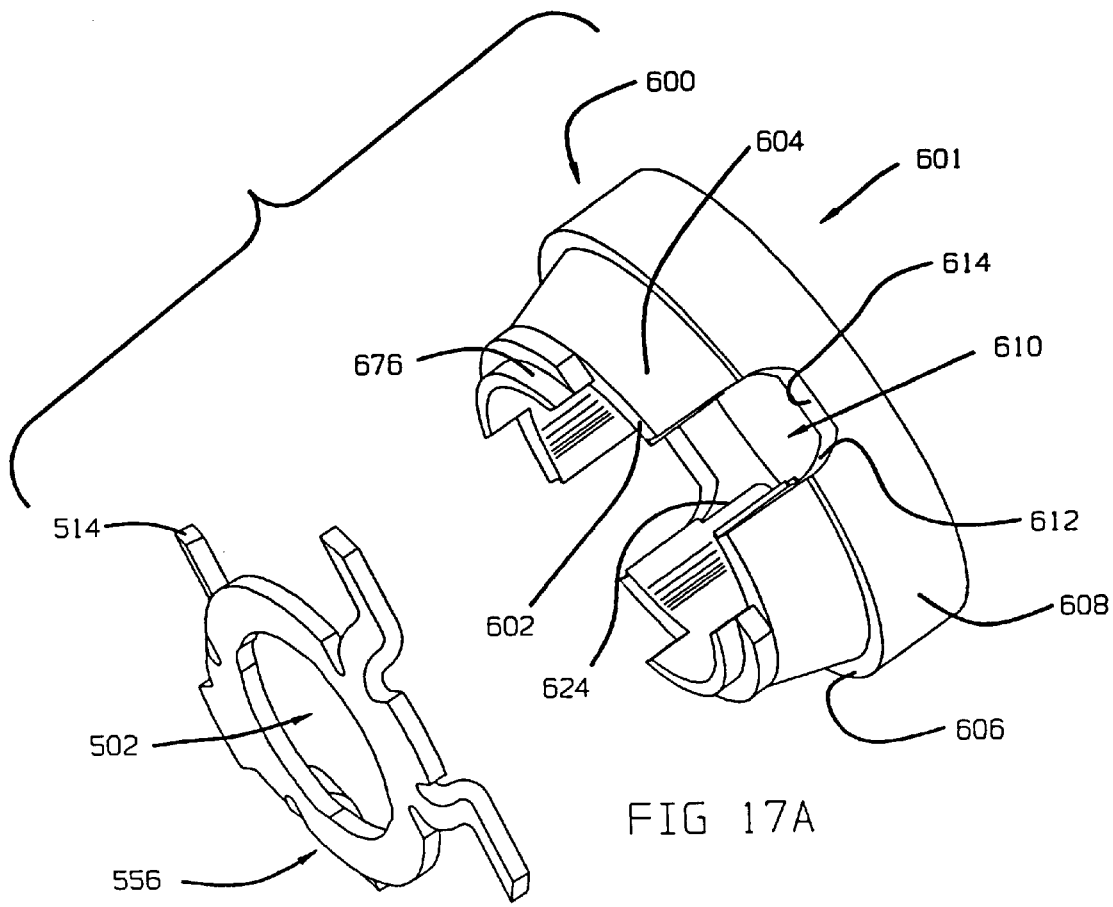
FIG. 17A is an isometric view of a first side of a confirmer ring-spring combination composed of the same type of material.
Figure 17B:
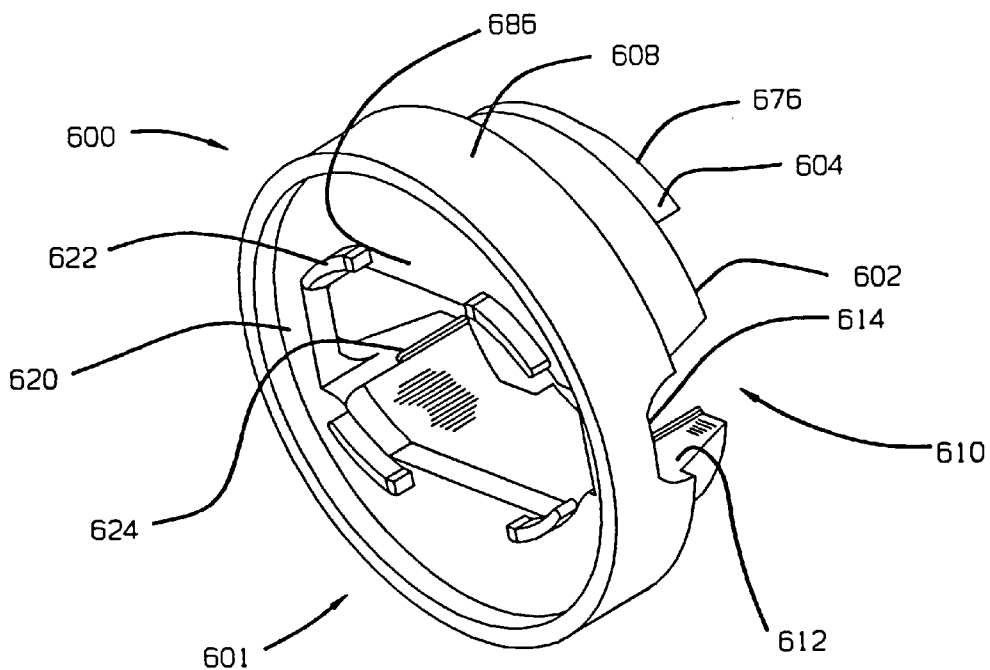
FIG. 17B is an isometric view of a second side of the combination of FIG. 17A.

Referring to FIGS. 15, 16, 17A, and 17B, a retainer body 556 is shown, as is a retainer form 558. The retainer form 558 in FIG. 16 is shown in a full view and a second adjacent retainer form 558 is shown phantomed below in the approximate location it would have when mounted on a confirmer-installer ring-spring combination composed of a polymerized material.

The body 556 transfers the force tending to pull apart the male and female conduits from the male portion of the connector 10 to the retainer (shown in FIGS. 15, 16, and 17), which in turn transfers the force to the abutting wall 44 in the female portion of connector 10.

The retainer body 556 has the general shape of a washer having with projections towards the center 510, 510', and 512 and 512' for mounting the body 556 on tubing 12. The body 556 is prevented from moving axially along the tube 12 by the bulged portion 22 and is prevented from moving in the opposite direction by the outer bushing 30. As in previous figures, the outer bushing 30 is prevented from detachment from portions 24 of the tube 12 by the flange 28.

The outer periphery 505 of the body 556 is interrupted by a plurality of set-off holding tabs 504. These tabs 504 are formed so as to have their rear surface parallel to the rear surface 508 of the body 556 so that the offset between the two is sufficient to allow the tabs 504 to have clearance around the wire form 558 in the area 560.

Accordingly, the tabs 504 work in conjunction with the confirmer ring-spring 600 (in FIGS. 17A and 17B) with the formed retainer form 558 installed into the ring-installer body 601 to allow connection between the ring-installer body 601 and the body 556. This connection prevents the confirmer ring-spring 600 from moving away from the flange 28 of tube 12 when the tube 12 is not installed into female receptacle 14.

The bottom inside surface of the tabs 504 allow the installed ring-spring 600 with the retainer form 558 to have the proper engage/disengage stroke of the combined ring-spring 614, thus allowing engagement or disengagement of retainer wire form 558.

FIG. 16 shows the retainer wire form 558. The form 558 is attached to the ring-spring 600 by means of the area 560 of the form 558 (which drives the wire form 558 into engagement in the female receptacle into the internal cavity 42). Ledges 624 engage legs 568 of the wire form 558 and a wire form lock 586 engages wall 620 of the ring-spring 600. The assembly is prevented from becoming loose by bosses 622 which are formed on rear the internal wall 620 of the ring-spring 600.

The assembly of wire form 558 to ring-spring 600 is accomplished by first installing area 560 of wire form 558 over area 676 of the ring-spring 600, then snapping hook lock 586 of wire form 558 into the pocket formed by bosses 622 and the rear internal wall 620 of the ring-spring 600. As wire form lock 586 is locked by bosses 622, some deflection is required of the legs 568 of the wire form 558 as legs 568 are also urged into nesting along the internal ledge 624 of the ring-spring 600. The ring-spring 600 includes an outer drum 608.

Figure 18:
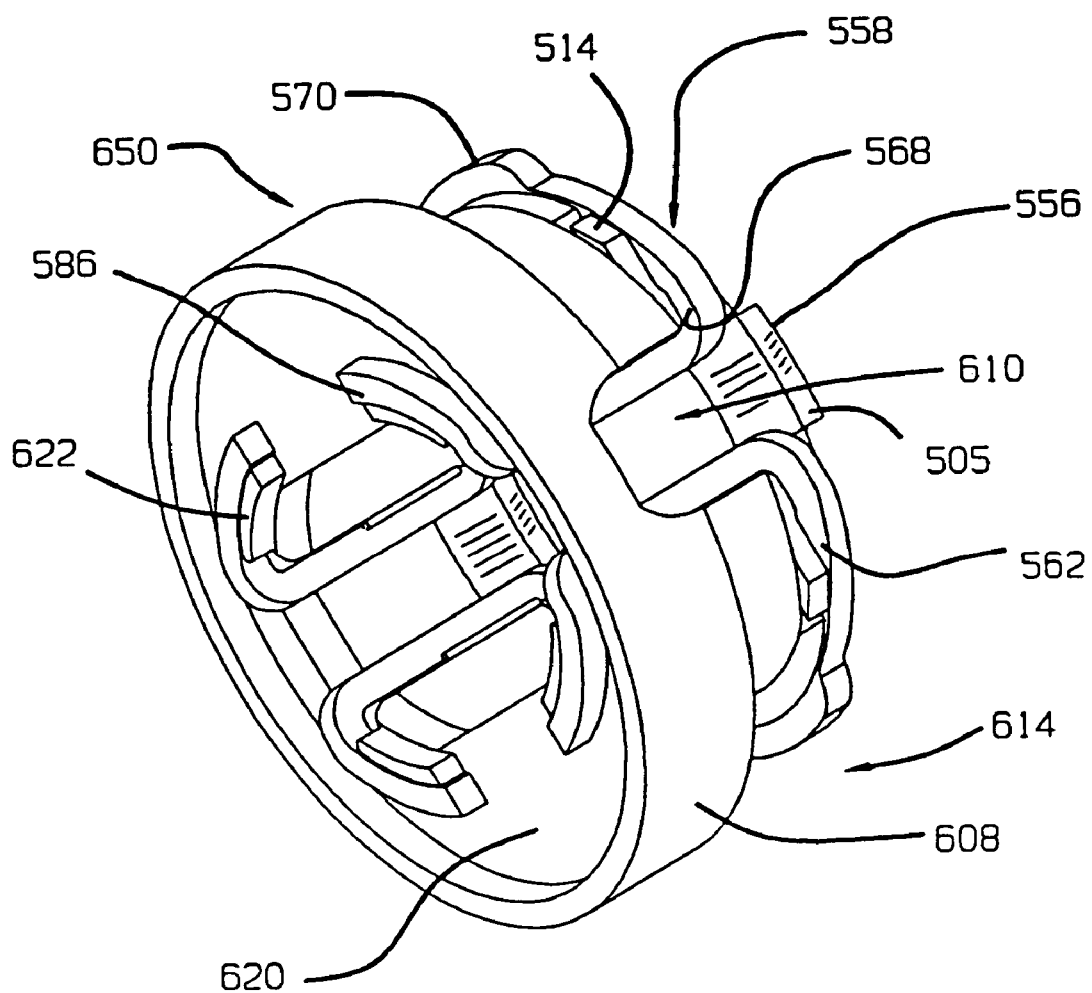
FIG. 18 is an isometric view of the assembled components of FIGS. 16, 17A, and 17B and the retainer body of FIG. 15 that transfers forces from the male portion to the female portion of the connection.

The springing areas 610 of the ring-spring 600 are defined by slots defined between the outer surface of the ring-spring 600 to its inner surface, illustrated as areas 612 and 614. The volume of material that must be deformed in the spring area 610 is governed by the disengagement forces that can be applied and the engagement forces developed by the action of the area 570 of the wire form 558 being pushed into the lead-in chamfer area 38 illustrated in FIGS. 10 and 11. The ring-spring 600 also includes an area 602 that urges the wire form 558 into the female receptacle 14 by pushing on the assembly 650 that is shown in FIG. 18. The outer surface 604 nests in the ridge sections 40 and lead-in chamber 38 of the female receptacle 14. The radial outside area 606 provides visual confirmation of proper connection by nesting with the face 36 of the female receptacle 14.

FIG. 18 shows an assembly 650 of the wire form 558 and the ring-spring 600. The forces on the male conduit 12 are transferred to the female receptacle 14 by means of the body 556.

Reference is next made to the embodiment of FIGS. 19, 20, and 21. These figures disclose an embodiment having a separate material spring only and a confirmation ring and latches (comprising engaging lugs).

FIG. 19 shows the spring 758 and FIG. 20 shows the body portion 700. FIG. 21 shows an assembly 750 which represents the combination of spring 758 and body portion 700 assembled over the front body 556 with the outer periphery 505 truncated at the bottom or root of the tabs 504 which are assembled into the slots 725 so that the ends 514 of the tabs 504 are flush with the area 704 of the body 700. This allows the body 700 to be attached to the front body 556, so that the body 700 will not move from the end of the conduit 12. The pull apart forces between the male portion of the conduit 12 and the female receptacle 14 are resisted by engaging the latch area 776 on body 700 with the female abutting wall 44. The hole 502 formed in the front body 556 through which the male conduit 12 passes transfers the male/female separation force from the male conduit 12 to the front body 556, then through the area 704 of the body 700 and to the female receptacle 14 via engaging the latch area 776 which abut the wall 44 in the female receptacle 14.

The spring 758 allows the body 700 to be pivoted in the loop area 785 of the spring 758 and the full round portion of body 700 behind the cut out portion 710. This pivot is required for the outer surface 774 of the latch area 776 to pass through the ridge section 40 of female receptacle 14. The latch area 776 is urged outward into the internal cavity 42 by the spring 758 engaging the inner body pocket (not shown) of the body 700.

With respect to FIG. 19, a detailed view of the spring 758 is shown. The spring 758 consists of an outwardly turned area 786 which is used to abut the body 700 and to prevent movement out of the body 700 past the rear wall 720 of the body 700 and an inside tab (not shown) that abuts the loop areas 785 of the spring 758 between the legs 768 of the spring 758.

FIG. 20 shows the body 700 with outside diameter 708, and inwardly stepped wall 706 that is flush with and is spaced apart from the face 36 of female receptacle 14, a chamfered surface 702 that nests in the lead-in and compressing chamfer area 38, and an area 704 which passes through the ridge section 40 in the female receptacle 14. The latch area 776 projects outward from the area 704, and a plurality of slots 725 are formed through the area 704 and accommodate tab ends 514 of a front body 556 having the periphery 505 removed between the tabs 504 and the outside tabs 504 of the front body 556 of FIG. 15. The outside surface of the largest diameter 708 of the body 700 is partially interrupted by two cut-out areas 710 (defining inner surfaces 712) that allow the body 700 to be squeezed to permit the outer surface 774 of the latch area 776 to pass through the ridge section 40 in the female receptacle 14. Aperture 722 of body 700 provides an opening for positioning of loop areas 785 of the springs 758. A hole 718 formed through the rear wall 720 of the body 700 provides stability of the body 700 when mounted on the conduit 12.

FIG. 22 shows an embodiment in which the latch, the spring and the confirmer ring are formed from a single material. In the embodiment shown, the material is a polymerized material such as nylon, acetal, or polypropylene. This embodiment could be composed of a metal (at higher cost), provided that the metal has good spring characteristics.

The connector of FIG. 22, generally illustrated as 800, comprises a body 801 having an outer drum 808, a chamfer portion 802, and a step 806 formed therebetween. The drum 808 defines a rear wall 820 having a centrally-defined hole 818 formed therein. A cylindrical area 804 is formed on the chamfer portion 802 area 804. The cylindrical area 804 is divided roughly into two halves by a cut out portion 810. Slots 825 are defined in the cylindrical area 804 and function as the slots 725 of the embodiment of FIGS. 20 and 21. Projecting outward from area 804 is latching area 876 having formed thereon an outer surface 874.

To achieve the necessary springing function, two notches 810 are formed on the drum 808, chamfer portion 802, and step 806. The area of the drum that is not cut-out and wall 820 provide the springing function. Wall 820 has a through hole 818 which operates the same as hole 718 of FIG. 20.

Referring to FIG. 23, a method is shown for preventing the unlatching of the engaging lugs on springing type retainers that hold the male portion of a connection inside a female portion of a connection by preventing the springing portions of the retainer from translating towards each other. In FIG. 23 a sectional top view of a preventing element, generally illustrated as 950, is shown. The preventing element 950 is slidable relative to the male conduit and the retainer. The element 950 is shown in relation to the retaining confirming-installing device of FIG. 22, together with a portion of the male conduit. The element 950 prevents the unlocking of the confirming-installing device of FIG. 22 from the female receptacle.

The element 950 and the confirming-installing device of FIG. 22 forms an assembly, generally indicated as 900. The assembly 900 includes the device 800 mounted on a tube 912 having a bulged area 920. The preventing element 950 also shown, and is composed of a body 952 having a through hole 954 and a pair of spring arms 956 and 958. The spring arms 956 and 958 are disposed along tube 912 with areas 960 and 962 terminating the spring arms 956 and 958. The areas 960 and 962 have surfaces 964 and 966 that operate to spread the spring arms 956 and 958 apart when the body 952 is urged forward against the tube side of the bulged area 920 formed on the tube 912. The spreading of the spring arms 956 and 958 move areas 960 and 962 which also have areas 968 and 970. These latter elements are forced into the cut-out areas 810 of device 800. This arrangement prevents the movement of latching areas 876 from being unlatched from the female receptacle (not shown). The preventing element 950 is detented (not shown) in device 800 in the removal-preventing, forward position where areas 968 and 970 prevent the unlatching of the device 800.

Those skilled in the art can now appreciate from the foregoing description that the broad teachings of the present invention can be implemented in a variety of forms, including the combination of the strip or wire and the ring. Therefore, while this invention has been described in connection with particular examples thereof, the true scope of the invention should not be so limited since other modifications will become apparent to the skilled practitioner upon a study of the drawings, specification and following claims.

What is claimed is:

1. A quick connector assembly for coupling a male conduit to a female receptacle and to confirm the coupling, said female receptacle having a bore centrally extending therethrough defined by an inside surface and an enlarged lead-in section continuous with said inside surface, said assembly comprising:

a member having a throughbore and interface portions extending therefrom for engaging the female receptacle, said member surrounding a predetermined portion of the male conduit, said member being positionable within the enlarged lead-in section of the female receptacle;

a confirmer body for confirming the positioning of said member within the female receptacle, said confirmer body including an aft end, said confirmer body being movable between a seated position wherein at least a portion of said confirmer body is nested within the enlarged lead-in section of the female receptacle and wherein said aft end of said confirmer body rests evenly with respect to the female receptacle and an unseated position wherein said confirmer body is in spaced apart relation from the enlarged lead-in section, said confirmer body transferring the pull apart force from said male conduit to said female receptacle through said interface portions; and whereby said confirmer body confirms to an installer that the member is positioned within the female receptacle when said aft end of said confirmer body rests evenly with respect to the female receptacle when said confirmer body is moved toward said seated position.

2. The quick connector assembly of claim 1, wherein the male conduit has a longitudinal axis and wherein said member includes a leg segment attached thereto, said leg segment being defined by a pair of projecting elements each extending substantially perpendicular to said confirmer body such that said leg segment is orientated substantially parallel with the longitudinal axis of the male conduit adjacent thereto.

3. The quick connector assembly of claim 2, wherein said leg segment is composed of a flat strip of material.

4. The quick connector assembly of claim 2, wherein said leg segment is composed of a wire.

5. The quick connector assembly of claim 2, wherein said member includes a pair of leg segments.

6. The quick connector assembly of claim 5, wherein each of said pair of projecting elements are at least partially movable toward one another for an installing and removing position and away from one another for an installed position.

7. The quick connector assembly of claim 6, wherein said projecting elements are movable toward each other by use of the installer's hands.

8. The quick connector assembly of claim 6, wherein said projecting elements are movable toward each other by use of a tool.

9. The quick connector assembly of claim 5, wherein each of said leg segments is integral with said member, said member and said leg segments being formed from a piece of wire, said piece of wire having a pair of free ends, said free ends being attached by welding.

10. The quick connector assembly of claim 5, wherein each of said leg segments is integral with said member, said member and said leg segments being formed from two pieces of wire, each of said two pieces of wire having a pair of free ends, each of said pair of free ends of a first one of said two pieces of wire being attached by welding to each of said pair of free ends of a second one of said two pieces of wire.

11. The quick connector assembly of claim 5, wherein said aft end of said confirmer body has an aperture centrally defined therein, said aperture including an inner wall, said inner wall having depending therefrom an opposed pair of fingers.

12. The quick connector assembly of claim 11, wherein each finger of said pair of fingers is movable between said pair of projecting elements of each of said leg segments.

13. The quick connector assembly of claim 12, wherein each finger of said pair of fingers prevents movement of adjacent projecting elements toward each other and subsequent removal of said confirmer body from the female receptacle when said confirmer body is in said seated position.

14. The quick connector assembly of claim 1, wherein said member is composed of a first material and said confirmer body is composed of a second material, said first and said second materials being different from each other.

15. The quick connector assembly of claim 14, wherein said first material is a plastic and said second material is a metal.

16. The quick connector assembly of claim 14, wherein said first material is a metal and said second material is a plastic.

17. A quick connector assembly for coupling a male conduit to a female receptacle and to confirm the coupling, said female receptacle having a bore centrally extending therethrough defined by an inside surface and an enlarged lead-in section continuous with said inside surface, said assembly comprising:
   a member having a throughbore and interface portions extending therefrom for engaging the female receptacle, said member surrounding a predetermined portion of the male conduit, said member being positionable within the enlarged lead-in section of the female receptacle; and
   a confirmer body for confirming the positioning of said member within the female receptacle, said confirmer body including an aft end, said confirmer body being slidably movable along said male conduit between a seated position wherein at least a portion of said confirmer body is nested within the enlarged lead-in section of the female receptacle and wherein said aft end of said confirmer body rests evenly with respect to the female receptacle and an unseated position wherein said confirmer body is in spaced apart relation from the enlarged lead-in section,
   whereby engagement of said interface portions with said female receptacle results in said member being locked against removal from the female receptacle and whereby said confirmer body confirms to an installer that the member is positioned within the female receptacle when said aft end of said confirmer body rests evenly with respect to the female receptacle when said confirmer body is moved into said seated position, said confirmer body preventing disengagement of said interface portions with said female receptacle when said confirmer body is moved into said seated position.

18. The quick connector assembly of claim 17, wherein said member is composed of a first material and said confirmer body is composed of a second material, said first and said second materials being different from each other.

19. The quick connector assembly of claim 18, wherein said first material is a plastic and said second material is a metal.

20. The quick connector assembly of claim 18, wherein said first material is a metal and said second material is a plastic.

21. The quick connector assembly of claim 17, wherein the male conduit includes a longitudinal axis and wherein said member includes a pair of leg segments attached thereto, each of said leg segments extending substantially parallel to the longitudinal axis of the male conduit adjacent thereto.

22. The quick connector assembly of claim 21, wherein each of said leg segments is composed of a flat strip of material.

23. The quick connector assembly of claim 21, wherein each of said leg segments is composed of a wire.

24. The quick connector assembly of claim 23, wherein each of said leg segments is integral with said interface portions, said interface portions and said leg segments being formed from a piece of wire, said piece of wire having a pair of free ends attached by welding.

25. The quick connector assembly of claim 21, wherein each of said pair of leg segments are at least partially movable toward one another for an installing and removing position and away from one another for an installed position.

26. The quick connector assembly of claim 25, wherein said leg segments are movable toward each other by use of the installer's hands.

27. The quick connector assembly of claim 25, wherein said leg segments elements are movable toward each other by use of a tool.

28. A quick connector assembly for coupling a male conduit to a female receptacle and to confirm the coupling, said female receptacle having a bore centrally extending therethrough defined by an inside surface and an enlarged lead-in section continuous with said inside surface, said assembly comprising:
   a member having a throughbore, said member surrounding a predetermined portion of the male conduit, said member being positionable within the enlarged lead-in section of the female receptacle, said member including a body surrounding said male conduit and a pair of waist segments attached to said surrounding body, said waist segments being interconnected by a pair of leg segments, each of said leg segments being defined by a pair of projecting elements each extending perpendicular to said waist segments, each pair of projecting elements forming a gap therebetween; and
   a confirming ring for confirming the positioning of said member within the female receptacle, said confirming ring including a fore end and an aft end, said fore end having formed thereon a receptacle-abutting face for nesting with the enlarged lead-in portion of the female receptacle, said aft end of said ring having a finger formed thereon, said finger being slidably movable within one of said gaps formed between each pair of projecting elements.

29. The quick connector assembly of claim 28, wherein said member is composed of a first material and said confirming ring is composed of a second material, said first and said second materials being different from each other.

30. The quick connector assembly of claim 29, wherein said first material is a plastic and said second material is a metal.

31. The quick connector assembly of claim 29, wherein said first material is a metal and said second material is a plastic.

32. The quick connector assembly of claim 28, wherein said ring is slidably movable along the male conduit between a seated position wherein at least a portion of said ring is nested within the enlarged lead-in section of the female receptacle and wherein said aft end of said ring rests evenly with respect to the female receptacle and an unseated position wherein said ring is in spaced apart relation from the enlarged lead-in section.

33. The quick connector assembly of claim 28, wherein each of said pair of projecting elements are at least partially movable toward one another for an installing and removing position and away from one another for an installed position.

34. The quick connector assembly of claim 33, wherein said projecting elements are movable toward each other by use of the installer's hands.

35. The quick connector assembly of claim 33, wherein said projecting elements are movable toward each other by use of a tool.

36. The quick connector assembly of claim 28, wherein each of said leg segments is composed of a flat strip of material.

37. The quick connector assembly of claim 28, wherein each of said leg segments is composed of a wire.

38. The quick connector assembly of claim 28, wherein each of said leg segments is integral with said waist segments, said waist segments and said leg segment being formed from a piece of wire, said piece of wire having a pair of free ends, said ends being attached by welding.

39. The quick connector assembly of claim 28, wherein each finger of said pair of fingers prevents movement of adjacent projecting elements toward each other and subsequent removal of said body from the female receptacle when said body is in said seated position.

40. A quick connector assembly for coupling a male conduit to a female receptacle and to confirm the coupling, said female receptacle having a bore centrally extending therethrough defined by an inside surface and an enlarged lead-in section continuous with said inside surface, said assembly comprising:

a member having a throughbore, said member surrounding a predetermined portion of the male conduit, said member being positionable within the enlarged lead-in section of the female receptacle, said member including a body surrounding said male conduit and a pair of waist segments attached to said body, said waist segments being interconnected by a pair of leg segments, each of said leg segments being defined by a pair of projecting elements each extending perpendicular to said waist segments, each pair of projecting elements forming a gap therebetween; and a confirming ring for confirming the positioning of said member within the female receptacle, said confirming ring including a fore end and an aft end, said fore end having formed thereon a receptacle-abutting face for nesting with the enlarged lead-in portion of the female receptacle, said aft end of said ring having a pair of fingers formed thereon, one finger of said pair of fingers being slidably movable within one of said gaps formed between each pair of projecting elements, said ring being slidably movable along the male conduit between a seated position wherein at least a portion of said ring is nested within the enlarged lead-in section of the female receptacle and wherein said aft end of said ring rests evenly with respect to the female receptacle and an unseated position wherein said ring is in spaced apart relation from the enlarged lead-in section, whereby said confirming ring confirms to an installer that the male conduit is positioned within the female receptacle when said connector assembly is correctly installed.

41. The quick connector assembly of claim 40, wherein said member is composed of a first material and said confirming ring is composed of a second material, said first and said second materials being different from each other.

42. The quick connector assembly of claim 41, wherein said first material is a plastic and said second material is a metal.

43. The quick connector assembly of claim 41, wherein said first material is a metal and said second material is a plastic.

44. The quick connector assembly of claim 40, wherein each of said pair of projecting elements are at least partially movable toward one another for an installing and removing position and away from one another for an installed position.

45. A quick connector assembly for coupling a male conduit to a female receptacle and to confirm the coupling, said female receptacle having a bore centrally extending therethrough defined by an inside surface and an enlarged lead-in section continuous with said inside surface, said assembly comprising:

a member having a throughbore, said member surrounding a predetermined portion of the male conduit, said member being positionable within the enlarged lead-in section of the female receptacle, said member including a body disposed around said male conduit and a pair of waist segments attached to said body, said waist segments being interconnected by a pair of leg segments, each of said leg segments being defined by a pair of projecting elements each extending perpendicular to said waist segments, each pair of projecting elements forming a gap therebetween, said waist segments having interface portions mounted thereon, said waist segments being attachably engageable with the female receptacle; and a confirming ring for confirming the positioning of said member within the female receptacle, said confirming ring including a fore end and an aft end, said fore end having formed thereon a receptacle-abutting face for nesting with the enlarged lead-in portion of the female receptacle, said aft end of said ring having a finger formed thereon, said finger being slidably movable within one of said gaps formed between each pair of projecting elements, said ring being slidably movable along the male conduit between a seated position wherein at least a portion of said ring is nested within the enlarged lead-in section of the female receptacle and wherein said aft end of said ring rests evenly with respect to the female receptacle and an unseated position wherein said ring is in spaced apart relation from the enlarged lead-in section, whereby engagement of said interface portions with the female receptacle results in said member being locked against removal from the female receptacle and whereby said confirmer ring confirms to an installer that the male conduit is positioned within the female receptacle when said aft end of said ring rests evenly with respect to the female receptacle when said ring is moved toward said seated position.

46. A method of coupling a male conduit to a female receptacle using a quick connector provided in association with said male conduit, said quick connector including a member having a leg segment extending substantially perpendicularly from said member, said female receptacle including a member-receiving channel, said quick connector further including a confirmer ring, said confirmer ring being slidable along said leg segment between a first position wherein said confirmer ring is spaced apart from said member and a second position wherein said confirmer ring is substantially seated against said female receptacle thereby confirming to the installer that said member of said quick connector is properly locked within said channel of said female receptacle, said method including the steps of:
- sliding said confirmer ring to said first position on said leg segment;
- inserting said male conduit into said female receptacle such that said member engages said channel of said female receptacle;
- sliding said confirmer ring from said first position to said second position; and
- confirming by reference to said confirmer ring that said member of said quick connector is locked within said channel.

47. The method of claim 46, wherein said female receptacle includes an outer wall and said confirmer ring includes a body, said method further including the step of confirming that said body of said confirmer ring rests against said outer wall of said female receptacle.

48. The method of claim 46, wherein said leg segment comprises a pair of projecting elements, said elements being partially compressible toward one another and wherein said confirmer ring includes a projecting finger, said finger being movable between said pair of projecting elements, said method further including the step of compressing said elements toward one another to engage said member of said quick connector with said channel of said female receptacle.

49. The method of claim 48, further including the step of uncoupling said male conduit from said female conduit by using a tool to compress said pair of projecting elements toward one another.

50. The method of claim 48, further including the step of uncoupling said male conduit from said female conduit by using a hand to compress said pair of projecting elements toward one another.

51. A method of connecting a male conduit to a female receptacle using a quick connector provided in association with said male conduit, said quick connector including a member having a leg segment extending substantially perpendicularly from said member, said leg segment including a pair of projecting elements, said projecting elements being partially compressible toward one another, said female receptacle including a member-abutting wall and a member-receiving channel, said quick connector further including a ring positionable substantially adjacent said member, said method including the steps of:
- grasping the quick connector and the male conduit; and
- inserting said male conduit and a portion of said associated quick connector into said female receptacle, whereby said projecting elements are compressed toward one another, until said member abuts said member-abutting wall and said projecting elements move away from one another; and
- sliding said ring adjacent to said member to prevent said projecting elements from being compresses toward one another.

52. The method of connecting of claim 51, further including the step of uncoupling said male conduit from said female receptacle by sliding said ring away from said member and using a tool to apply compressing force to said pair of projecting elements.

53. The method of connecting of claim 51, further including the step of uncoupling said male conduit from said female receptacle by sliding said ring away from said member and using a hand to apply compressing force to said pair of projecting elements.

54. A method of removing a male conduit from a female receptacle using a quick connector provided in association with said male conduit, said quick connector including a member having a pair of latches extending therefrom, said latches being partially compressible toward one another, said female receptacle including a member-abutting wall and a member-receiving channel, said quick connector further including a confirming ring operatively associated with said member for preventing compression of said latches when said confirming ring is in an installed condition and for confirming the correctness of the installation, said method including the steps of:
- removing said confirming ring;
- compressing said pair of latches toward one another; and
- removing said male conduit and said associated quick connector from said female receptacle.

55. The method of removing of claim 54, wherein said step of compressing includes the step of using a tool to apply compressing force to said ring.

56. The method of removing of claim 54, wherein said step of compressing includes the step of using a hand to apply compressing force to said ring.

57. A quick connector assembly for coupling a male conduit to a female receptacle and to confirm the coupling, the female receptacle having a bore centrally extending therethrough defined by an inside surface and an enlarged lead-in section continuous with the inside surface, the bore having defined therein a latch-receiving slot, said assembly comprising:
- a latch deformable between an engaging position for engagement with the latch-receiving slot and a disengaging position for disengagement from the latch-receiving slot;
- a deformable spring operatively associated with said latch for urging said latch into said engaging position; and
- a confirmer ring for confirming the positioning of the male conduit within the female receptacle, said confirmer ring being operatively associated with said latch, said confirmer ring including a body, said body including an aft end, said body being movable in conjunction with said latch and the male conduit into a seated position wherein at least a portion of said body is nested within said enlarged lead-in section of the female receptacle and wherein said aft end of said body rests evenly with respect to the female receptacle;
- whereby said confirmer ring transfers separation forces existing between the male conduit and the female receptacle away from the male conduit and confirms to an installer that the male conduit is positioned within the female receptacle when said aft end of said body rests evenly with respect to the female receptacle when said body, in conjunction with said latch and the male conduit, is moved toward said seated position.

58. The quick connector assembly of claim 57, wherein said latch and said deformable spring comprise a single integral spring-latch component.

59. The quick connector assembly of claim 58, wherein said confirmer ring and said spring-latch component are composed of different materials.

60. The quick connector assembly of claim 58, wherein said confirmer ring and said spring-latch component are composed of the same material.

61. The quick connector assembly of claim 57, wherein said confirmer ring and said deformable spring comprise a single integral ring-spring component.

62. The quick connector assembly of claim 61, wherein said ring-spring component and said latch component are composed of different materials.

63. The quick connector assembly of claim 61, wherein said ring-spring component and said latch component are composed of the same material.

64. The quick connector of claim 57, wherein said confirmer ring and said latch comprise a single integral ring-latch component.

65. The quick connector of claim 64, wherein said deformable spring and said ring-latch component are composed of different materials.

66. The quick connector of claim 64, wherein said deformable spring and said ring-latch component are composed of the same material.

67. A quick connector assembly for coupling a male conduit to a female receptacle and to confirm the coupling, the female receptacle having a bore centrally extending therethrough defined by an inside surface and an enlarged lead-in section continuous with the inside surface, the bore having defined therein a latch-receiving slot, said assembly comprising:

a latch deformable between an engaging position for engagement with the latch-receiving slot and a disengaging position for disengagement from the slot; and a confirmer ring spring component for urging said latch into said engaging position and for confirming the positioning of the male conduit within the female receptacle, said confirmer ring spring component being operatively associated with said latch, said confirmer ring spring component including a body, said body including an aft end, said body being movable in conjunction with said latch and the male conduit into a seated position wherein at least a portion of said body is nested within said enlarged lead-in section of the female receptacle and wherein said aft end of said body rests evenly with respect to the female receptacle;

whereby said confirmer ring spring component confirms to an installer that the male conduit is positioned within the female receptacle when said aft end of said body rests evenly with respect to the female receptacle when said body, in conjunction with said latch and the male conduit, is moved toward said seated position.

68. The quick connector assembly of claim 67, wherein said latch and said confirmer ring spring component are composed of different materials.

69. The quick connector assembly of claim 67, wherein said latch and said confirmer ring spring component are composed of the same material.

70. A quick connector assembly for coupling a male conduit to a female receptacle and to confirm the coupling, the female receptacle having a bore centrally extending therethrough defined by an inside surface and an enlarged lead-in section continuous with the inside surface, the bore having defined therein a latch-receiving slot, said assembly comprising:

a confirmer ring including a latch portion deformable between an engaging position for engagement with the latch-receiving slot and a disengaging position for disengagement from the latch-receiving slot and for confirming the positioning of the male conduit within the female receptacle, said confirmer ring including a body, said body including an aft end, said body being movable in conjunction with said latch portion and the male conduit into a seated position wherein at least a portion of said body is nested within said enlarged lead-in section of the female receptacle and wherein said aft end of said body rests evenly with respect to the female receptacle;

a deformable spring operatively associated with said latch portion for urging said latch portion into said engaging position; and whereby said confirmer ring confirms to an installer that the male conduit is positioned within the female receptacle when said aft end of said body rests evenly with respect to the female receptacle when said body, in conjunction with the male conduit, is moved toward said seated position.

71. The quick connector assembly of claim 70, wherein said confirmer ring and said deformable spring are composed of different materials.

72. The quick connector assembly of claim 70, wherein said confirmer ring and said deformable spring are composed of the same material.

73. A quick connector assembly for coupling a male conduit to a female receptacle and to confirm the coupling, the female receptacle having a bore centrally extending therethrough defined by an inside surface and an enlarged lead-in section continuous with the inside surface, the bore having defined therein a latch-receiving slot, said assembly comprising:

a latch deformable between an engaging position for engagement with the latch-receiving slot and a disengaging position for disengagement from the latch-receiving slot;

a deformable spring for urging said latch into said engaging position; and a confirmer ring for confirming the positioning of the male conduit within the female receptacle, said confirmer ring including a body, said body including an aft end, said body being movable in conjunction with said latch and the male conduit into a seated position wherein at least a portion of said body is nested within said enlarged lead-in section of the female receptacle and wherein said aft end of said body rests evenly with respect to the female receptacle, said latch, said deformable spring, and said confirmer ring comprising a single integral component;

whereby said confirmer ring transfers separation forces existing between the male conduit and the female receptacle away from the male conduit and confirms to an installer that the male conduit is positioned within the female receptacle when said aft end of said body rests evenly with respect to the female receptacle when said body, in conjunction with said latch and the male conduit, is moved toward said seated position.

74. The quick connector assembly of claim 73, further including a locking element for preventing the removal of said integral component, said locking element comprising a body, said body having at least one spring arm, said spring arm being insertable between said confirmer ring and said male conduit, whereby said spring arm prevents the removal of said integral component from said female conduit.

75. The quick connector assembly of claim 74, wherein said spring arm comprises a pair of opposed spring arms.

76. The quick connector assembly of claim 74, wherein said body of said locking element has an aperture formed therein through which said male conduit is passed.

77. A quick connector assembly for coupling a male conduit to a female receptacle and to confirm the coupling, the female receptacle having a bore centrally extending therethrough defined by an inside surface and an enlarged lead-in section continuous with the inside surface, the bore having defined therein a latch-receiving slot, said assembly comprising:

a latch-deformable spring including a latch portion and a deformable spring portion, said latch portion being deformable between an engaging position for engagement with the latch-receiving slot and a disengaging position for disengagement from the latch-receiving slot, said deformable spring portion urging said latch portion into said engaging position;

a confirmer ring for confirming the positioning of the male conduit within the female receptacle, said confirmer ring being operatively associated with said latch-deformable spring, said confirmer ring including a body, said body including an aft end, said body being movable in conjunction with said latch-deformable spring and the male conduit into a seated position wherein at least a portion of said body is nested within said enlarged lead-in section of the female receptacle and wherein said aft end of said body rests evenly with respect to the female receptacle;

whereby said confirmer ring transfers separation forces existing between the male conduit and the female receptacle away from the male conduit and confirms to an installer that the male conduit is positioned within the female receptacle when said aft end of said body rests evenly with respect to the female receptacle when said body, in conjunction with said latch-deformable spring and the male conduit, is moved toward said seated position.

78. A method of coupling a male conduit to a female receptacle using a quick connector provided in association with said male conduit, said quick connector including a member having a leg segment extending substantially perpendicularly from said member, said female receptacle including a member-receiving channel, said quick connector further including a confirmer ring, said confirmer ring being slidable along said leg segment between a first position spaced from said member and a confirming position adjacent said member where said confirmer ring is substantially seated against said female receptacle thereby confirming to the installer that said member of said quick connector is properly locked within said channel of said female receptacle, said method including the steps of:

sliding said confirmer ring to said first position on said leg segment;

inserting said male conduit into said female receptacle such that said member engages said channel of said female receptacle;

sliding said confirmer ring to said confirming position; and confirming by reference to said confirmer ring that said member of said quick connector is locked within said channel.

79. A quick connector assembly for coupling a male conduit to a female receptacle, said female receptacle having a bore centrally extending therethrough defined by an inside surface and an enlarged lead-in section continuous with said inside surface, said assembly comprising:

a member having a throughbore and interface portions extending therefrom for engaging the female receptacle, said member surrounding a predetermined portion of the male conduit, said member being positionable within the enlarged lead-in section of the female receptacle; and a confirmer body being slidably movable along said male conduit between a seated position wherein at least a portion of said confirmer body is nested within the enlarged lead-in section of the female receptacle and an unseated position wherein said confirmer body is in spaced apart relation from the enlarged lead-in section, whereby engagement of said interface portions with said female receptacle results in said member being locked against removal from the female receptacle and whereby said confirmer body prevents disengagement of said interface portions with said female receptacle when said confirmer body is moved into said seated position.

* * * * *

UNITED STATES PATENT AND TRADEMARK OFFICE
CERTIFICATE OF CORRECTION

PATENT NO.    : 6,010,160
DATED         : January 4, 2000
INVENTOR(S)   : Donald D. Bartholomew Page 1 of 1

It is certified that error appears in the above-identified patent and that said Letters Patent is hereby corrected as shown below:

<u>Column 2,</u>
Line 25, delete "addition" and substitute -- additionally -- therefor <u>Column 4,</u>
Line 29, "6" should be -- 16 --
Line 45, "confirms" should be -- confirmer --

<u>Column 11,</u>
Line 48, delete "rear" and substitute -- the rear of -- therefor <u>Column 12,</u>
Line 4, delete "chamber" and substitute -- chamfer -- therefor
Line 33, delete "abut" and substitute -- abuts -- therefor <u>Column 13,</u>
Line 15, before "area" insert -- of cylindrical --

<u>Column 19,</u>
Line 54, delete "compresses" and substitute -- compressed -- therefor <u>Column 22,</u>
Line 52, delete "conduit" and substitute -- receptacle -- therefor Signed and Sealed this Seventeenth Day of September, 2002

*Attest:*

JAMES E. ROGAN
*Attesting Officer*    *Director of the United States Patent and Trademark Office*